(12) United States Patent
Roukes et al.

(10) Patent No.: US 11,624,715 B2
(45) Date of Patent: Apr. 11, 2023

(54) HIGHLY-MULTIPLEXED NEMS-ARRAY READOUT SYSTEM BASED ON SUPERCONDUCTING CAVITY OPTOMECHANICS

(71) Applicant: California Institute of Technology, Pasadena, CA (US)

(72) Inventors: Michael L. Roukes, Pasadena, CA (US); Chung Wah Fon, Alhambra, CA (US); Ewa Rej, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 17/512,363

(22) Filed: Oct. 27, 2021

(65) Prior Publication Data

US 2022/0050064 A1 Feb. 17, 2022

Related U.S. Application Data

(63) Continuation of application No. 16/788,094, filed on Feb. 11, 2020, now Pat. No. 11,187,663.

(Continued)

(51) Int. Cl.
*G01N 22/00* (2006.01)
*H01J 49/26* (2006.01)
*H01J 49/00* (2006.01)

(52) U.S. Cl.
CPC .......... *G01N 22/00* (2013.01); *H01J 49/0013* (2013.01); *H01J 49/26* (2013.01)

(58) Field of Classification Search
CPC .... G01N 22/00; G01N 29/036; G01N 29/348; G01N 29/36; G01N 29/022; H01J 49/0013; H01J 49/26; H03H 9/2447
See application file for complete search history.

(56) References Cited

U.S. PATENT DOCUMENTS 6,544,478 B1 * 4/2003 Oyama ................ G01N 29/022
436/151
9,250,215 B2 * 2/2016 Mori ...................... G01N 29/38
(Continued)

FOREIGN PATENT DOCUMENTS

CA          2678289 A1 *  3/2011  .............. G01V 1/28
WO   WO-2015052678 A1 *  4/2015  ........... G01N 33/487

OTHER PUBLICATIONS

U.S. Appl. No. 16/788,094, "Corrected Notice of Allowability", dated Nov. 4, 2021, 2 pages.

(Continued)

*Primary Examiner* — Francis C Gray
(74) *Attorney, Agent, or Firm* — Kilpatrick Townsend & Stockton LLP

(57) ABSTRACT

A NEMS readout system includes a sensor array comprising a plurality of sensors. Each sensor of the plurality of sensors including a resonator with frequency characteristics different from the resonator of each other sensor of the plurality of sensors. A readout signal indicative of a plurality of output signals is collected from the sensor array. Each output signal of the plurality of output signals corresponding to one of the plurality of sensors. An analysis of the plurality of output signals is performed to identify a plurality of resonant frequencies and to detect a frequency shift associated with at least one of the plurality of resonant frequencies.

20 Claims, 18 Drawing Sheets

Related U.S. Application Data

(60) Provisional application No. 62/803,972, filed on Feb. 11, 2019.

(56) References Cited

U.S. PATENT DOCUMENTS

| | | | |
|---|---|---|---|
| 10,381,206 B2 | 8/2019 | Roukes et al. | |
| 11,187,663 B2 | 11/2021 | Roukes et al. | |
| 2003/0033876 A1* | 2/2003 | Roukes | G01N 29/036 435/6.12 |
| 2005/0161749 A1 | 7/2005 | Yang et al. | |
| 2007/0023621 A1 | 2/2007 | Blick et al. | |
| 2009/0140728 A1* | 6/2009 | Rollins | G01B 7/023 324/207.16 |
| 2009/0261241 A1 | 10/2009 | Roukes et al. | |
| 2010/0173422 A1 | 7/2010 | Koley et al. | |
| 2010/0219914 A1 | 9/2010 | Sadek et al. | |
| 2014/0156224 A1 | 6/2014 | Roukes et al. | |
| 2014/0244180 A1 | 8/2014 | Roukes et al. | |
| 2015/0265158 A1* | 9/2015 | Edwards | A61B 5/7278 600/407 |
| 2015/0301058 A1 | 10/2015 | Schettini et al. | |
| 2018/0005809 A1 | 1/2018 | Roukes et al. | |
| 2018/0143123 A1 | 5/2018 | Hanay | |

OTHER PUBLICATIONS

U.S. Appl. No. 16/788,094, "Corrected Notice of Allowability", dated Sep. 2, 2021, 2 pages.

U.S. Appl. No. 16/788,094, "Corrected Notice of Allowability", dated Aug. 18, 2021, 8 pages.

U.S. Appl. No. 16/788,094, "Non-Final Office Action", dated Mar. 25, 2021, 21 pages.

U.S. Appl. No. 16/788,094, "Notice of Allowance", dated Jul. 27, 2021, 12 pages.

PCT/US2020/017773, "International Preliminary Report on Patentability", dated Aug. 26, 2021, 8 pages.

PCT/US2020/017773, "International Search Report and Written Opinion", dated Apr. 28, 2020, 9 pages.

EP20756125.9, "Extended European Search Report", dated Sep. 15, 2022, 8 pages.

Sampathkumar, "Multiplexed Optical Operation of Nanoelectromechanical Systems (NEMS) Arrays for Sensing and Signal-Processing Applications", Proceedings of SPIE, IEEE, vol. 9083, Jun. 25, 2014, pp. 90832Z-1-90832Z-12.

* cited by examiner

HIGHLY-MULTIPLEXED NEMS-ARRAY READOUT SYSTEM BASED ON SUPERCONDUCTING CAVITY OPTOMECHANICS

CROSS-REFERENCES TO RELATED APPLICATIONS

This application is a continuation of U.S. patent application Ser. No. 16/788,094, filed Feb. 11, 2020, entitled "HIGHLY-MULTIPLEXED NEMS-ARRAY READOUT SYSTEM BASED ON SUPERCONDUCTING CAVITY OPTOMECHANICS", which claims priority to U.S. Provisional Patent Application No. 62/803,972, filed on Feb. 11, 2019, entitled "HIGHLY-MULTIPLEXED CAVITY OPTO-MECHANICAL SYSTEM FOR SINGLE-MOLECULE MASS SPECTROMETRY AND INERTIAL IMAGING", the disclosures of which are hereby incorporated by reference in their entirety.

BACKGROUND OF THE INVENTION

Biological function at the cellular and molecular level is enacted by intact proteoforms and multiproteoform complexes. Proteoforms are the wide variety of different molecular forms that protein products of a single gene can assume. These entities are modified at the genetic, transcriptional, or posttranslational level, which provides them with great diversity. Individual proteoforms are subsequently conjoined by covalent and non-covalent interactions to form multiproteoform complexes (MPCs), and these further endow these entities with their wide spectrum of essential biological functions.

At present, because of the limits of instrumentation for mass spectrometry, the mainstay for protein analysis includes various "bottom up" methods. These methods generally include first fragmenting the proteoforms and MPCs into small and analyzable pieces. Subsequently, bioinformatics is employed to deduce their original, previously-assembled configurations. In other words, methods of bottom-up proteomics do not reveal the nature of intact proteoforms and MPCs directly; this must be inferred. Although this approach facilitates developing hypotheses of the critical structural characteristics and protein-protein interactions that engender proteoform and MPC functions, these often cannot be directly confirmed.

To address these shortcoming, "top-down" analyses have emerged; these begin with intact proteoforms and MPCs. Top-down methods are important, not only to confirm the identity of cellular protein complexes but also to provide insight to the multiple proteoforms present. Current top-down proteomics methods, however, are severely challenged by the vast complexity of MPC heterogeneity. Addressing this requires laborious and often problematic preparatory protocols to avoid "averaging" over nearly mass-degenerate species. These preparatory protocols can completely remove the rarest analytes, often ones that are especially significant.

Cavity optomechanics generally refers to the coupling between electromagnetic radiation with micro- and nano-mechanical resonators. Here, "opto" can refers to photons in the microwave or optical regime. Modern applications of superconducting microwave-frequency resonant cavities can be utilized in the context of circuit quantum electrodynamics CQED. This can be explored, applied, and validated for quantum computation, specifically, as a readout for qubits. Parametric coupling of the cavity to nanomechanical devices can engender cooling to the ground mechanical state and, furthermore, evasion of quantum backaction upon the mechanical system. While these quantum regime explorations can be carried out at temperatures well below 100 mK, the principles of superconducting cavity optomechanical readout apply to the classical regime at higher temperatures (but still below the superconducting transition temperature).

SUMMARY OF THE INVENTION

The present invention relates generally to methods and systems for single molecule analysis using sensor arrays. More particularly, embodiments of the present invention relate to a highly-multiplexed cavity optomechanical readout system that utilizes multiple NEMS sensors coupled to a single microwave-frequency superconducting cavity resonator. The methods and techniques can be applied to a variety of materials, applications, and fields. A summary of the invention is provided below as a list of examples. As used below, any reference to a series of examples is to be understood as a reference to each of those examples disjunctively (e.g., "Examples 1-4" is to be understood as "Examples 1, 2, 3, or 4").

Example 1 is a method of operating a readout system, the method comprising: providing a sensor array comprising a plurality of sensors, each sensor of the plurality of sensors including a resonator with frequency characteristics different from the resonator of each other sensor of the plurality of sensors; collecting a readout signal indicative of a plurality of output signals from the sensor array, each output signal of the plurality of output signals corresponding to one of the plurality of sensors; performing an analysis of the plurality of output signals to determine the frequency characteristics associated with the resonator of each sensor of the plurality of sensors; and based on the analysis of the plurality of output signals: identifying a plurality of resonant frequencies, each resonant frequency of the plurality of resonant frequencies corresponding to one of the plurality of output signals and one of the plurality of sensors; and detecting a frequency shift associated with at least one of the plurality of resonant frequencies.

Example 2 is the method of example(s) 1, wherein each resonant frequency of the plurality of resonant frequencies is operable to change upon adsorption of an analyte on each resonator.

Example 3 is the method of example(s) 2, wherein the analyte is one of a particle, an atom, a molecule, a biomolecule, a protein, or a multi-proteoform complex.

Example 4 is the method of example(s) 1, wherein each output signal of the plurality of output signals is indicative of the frequency characteristics of the resonator of one of the plurality of sensors.

Example 5 is the method of example(s) 1, wherein the plurality of sensors are nanoelectromechanical system (NEMS) sensors.

Example 6 is the method of example(s) 1, further comprising: providing at least one excitation signal to the plurality of sensors.

Example 7 is the method of example(s) 6, wherein the at least one excitation signal comprises a signal having a power across a range of frequencies that is substantially constant.

Example 8 is the method of example(s) 6, wherein the at least one excitation signal comprises a signal having a power at each of the plurality of resonant frequencies that is greater than a threshold power.

Example 9 is the method of example(s) 1, wherein the plurality of resonant frequencies correspond to a fundamental mode band or a first mode band.

Example 10 is the method of example(s) 9, further comprising: based on the analysis of the plurality of output signals: identifying a second plurality of resonant frequencies associated with the plurality of sensors, wherein the second plurality of resonant frequencies correspond to a second mode band; and detecting a second frequency shift associated with at least one of the second plurality of resonant frequencies.

Example 11 is the method of example(s) 1, further comprising combining the plurality of output signals into the readout signal.

Example 12 is the method of example(s) 1, wherein the plurality of output signals are collected concurrently.

Example 13 is a readout system comprising: a sensor array comprising a plurality of sensors, wherein each sensor of the plurality of sensors includes a resonator with frequency characteristics different from the resonator of each other sensor of the plurality of sensors, and wherein the plurality of sensors are configured to generate a plurality of output signals, each output signal of the plurality of output signals being indicative of the frequency characteristics associated with the resonator of one of the plurality of sensors; and a computing system coupled to the sensor array, wherein the computing system is configured to: collect a readout signal indicative of the plurality of output signals; perform an analysis of the plurality of output signals to determine the frequency characteristics associated with the resonator of each sensor of the plurality of sensors; and based on the analysis of the plurality of output signals: identify a plurality of resonant frequencies, each resonant frequency of the plurality of resonant frequencies corresponding to one of the plurality of output signals and one of the plurality of sensors; and detect a frequency shift associated with at least one of the plurality of resonant frequencies.

Example 14 is the readout system of example(s) 13, wherein the plurality of sensors are nanoelectromechanical system (NEMS) sensors.

Example 15 is the readout system of example(s) 14, wherein the resonator of each sensor of the plurality of sensors is characterized by a differing set of geometric dimensions.

Example 16 is the readout system of example(s) 15, wherein the set of geometric dimensions includes one of a length of a doubly clamped beam or a length of a cantilever beam.

Example 17 is the readout system of example(s) 13, wherein the unique frequency characteristics change upon adsorption of an analyte on the resonator.

Example 18 is the readout system of example(s) 17, wherein the analyte is at least one of a particle, an atom, a molecule, a biomolecule, a protein, or a multi-proteoform complex.

Example 19 is the readout system of example(s) 13, wherein the computing system is further configured to provide at least one excitation signal to the plurality of sensors.

Example 20 is the readout system of example(s) 19, wherein the at least one excitation signal comprises a signal having a power across a range of frequencies that is substantially constant.

Example 21 is the readout system of example(s) 19, wherein the at least one excitation signal comprises a signal having a power at each of the plurality of resonant frequencies that is greater than a threshold power.

Example 22 is the readout system of example(s) 13, wherein the plurality of resonant frequencies correspond to a fundamental mode band or a first mode band.

Example 23 is the readout system of example(s) 22, wherein the computing system is further configured to: based on the analysis of the plurality of output signals: identify a second plurality of resonant frequencies associated with the plurality of sensors, wherein the second plurality of resonant frequencies correspond to a second mode band; and detect a second frequency shift associated with at least one of the second plurality of resonant frequencies.

Example 24 is the readout system of example(s) 13, wherein the computing system is further configured to: combine the plurality of output signals into the readout signal.

Example 25 is the readout system of example(s) 13, wherein the plurality of output signals are collected concurrently.

Example 26 is a non-transitory computer-readable medium comprising instructions that, when executed by one or more processors, cause the one or more processors to perform operations comprising: collecting a readout signal indicative of a plurality of output signals from a sensor array, each output signal of the plurality of output signals corresponding to one of a plurality of sensors of the sensor array, wherein each sensor of the plurality of sensors includes a resonator with frequency characteristics different from the resonator of each other sensor of the plurality of sensors; performing an analysis of the plurality of output signals to determine the frequency characteristics associated with the resonator of each sensor of the plurality of sensors; and based on the analysis of the plurality of output signals: identifying a plurality of resonant frequencies, each resonant frequency of the plurality of resonant frequencies corresponding to one of the plurality of output signals and one of the plurality of sensors; and detecting a frequency shift associated with at least one of the plurality of resonant frequencies.

Numerous benefits are achieved by way of the present invention over conventional techniques. For example, embodiments described herein provide a new method of implementing arrays of NEMS sensors for single molecule analysis (including, but not limited to mass spectrometry and inertial imaging). This method may couple multiple NEMS sensors to a single microwave-frequency superconducting cavity resonator (SCR) for readout. The superconducting cavity resonator can be, but is not limited to, a half-wave coplanar waveguide resonator or a lumped circuit superconducting microwave resonator. In some instances, various disclosed setups can be used to mechanically actuate a NEMS sensor arrays. Alternatively or additionally, the individual sensors can be actuated by other means including, but not limited to, piezoelectric and thermoelastic actuation.

Embodiments described herein allow efficient readout of a sensor array. Namely, multiple NEMS devices (e.g., from 16 to 64 or more) can be frequency multiplexed to a single microwave-frequency superconducting cavity resonator, and subsequently be read out simultaneously. In some embodiments, multiple arrays can be fabricated within a small device footprint (area) so as to efficiently adsorb biomolecular ions from an incoming beam of analytes. For example, with a 16-SCR array each multiplexed to 64-NEMS devices, sensing with 1,024 NEMS sensors is enabled within a small footprint. This allows analyzing up to 60 million protein molecules in a short duration of time (e.g., 20 minutes).

Embodiments described herein utilize frequency multiplexing to operate a cavity with a large number of NEMS sensors. Nanomechanical devices are designed such that they are systematically staggered in frequency space to distribute their resonance frequencies over a desired frequency band. In the case where they are encompassed within the SCR linewidth, they can be frequency multiplexed and operated and read-out at the same time. Embodiments described herein may improve mass resolution, reduce the size of NEMS sensor devices, increase the NEMS sensor responsivity by increasing electro-mechanical coupling, and reduce the NEMS frequency-fluctuation noise through temperature reduction and stabilization. These and other embodiments of the invention along with many of its advantages and features are described in more detail in conjunction with the text below and attached figures.

DETAILED DESCRIPTION OF SPECIFIC EMBODIMENTS

Figure 1A:
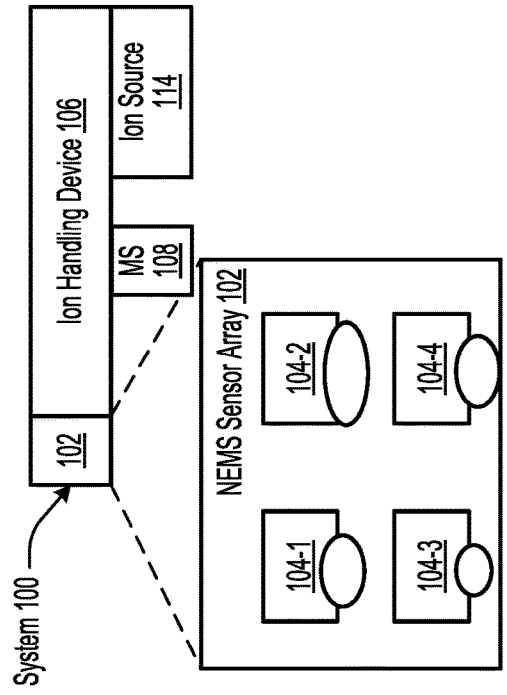
FIGS. 1A-1D illustrate various example steps for automated stratification of heterogeneous samples using a hybrid NEMS ion trap mass analyzer system according to an embodiment of the present invention.
Figure 1C:
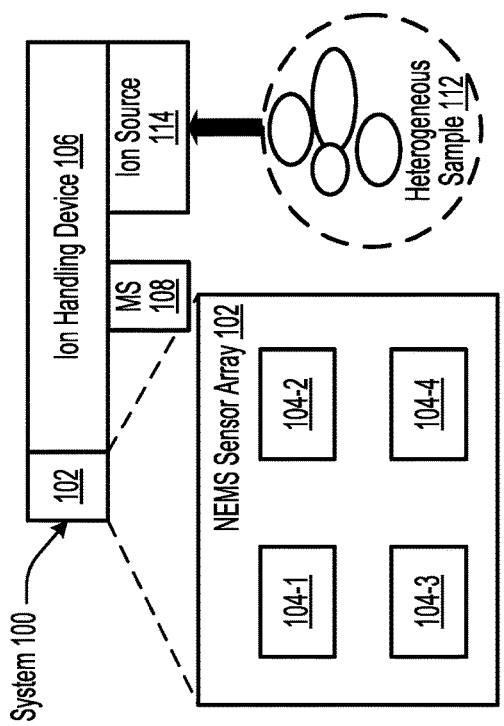
Figure 1B:
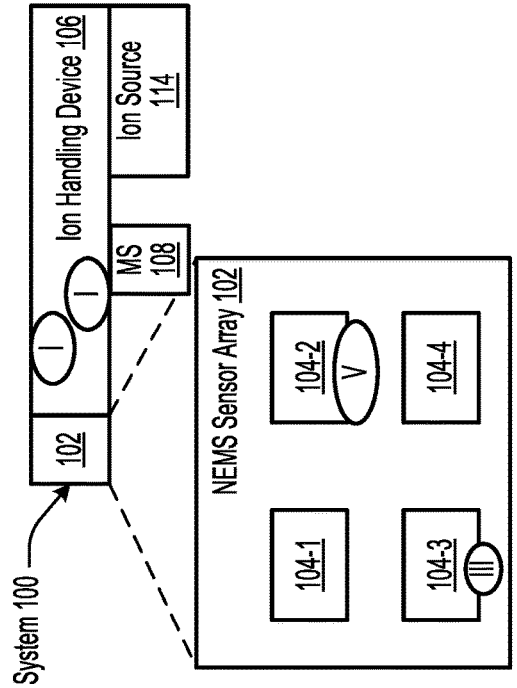
Figure 1D:
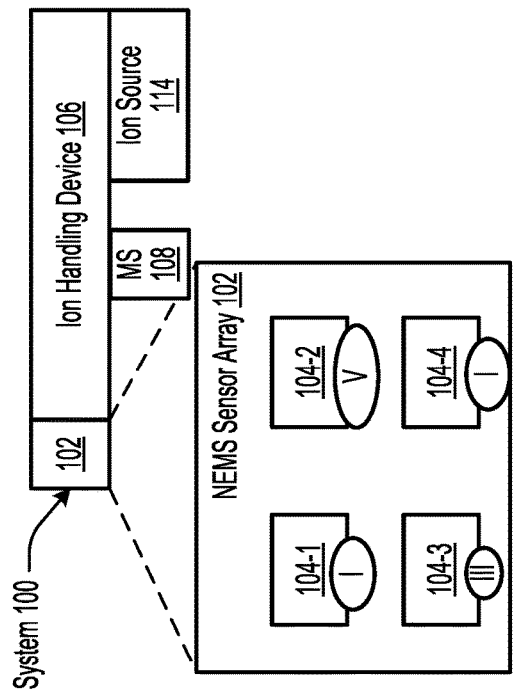

The instrumentation described herein provides a powerful tool for biochemical and medical research. An important example involves the profound cellular diversity in cancer. This disease remains the second most common cause of death in this country. During the past three decades, the pharmaceutical industry has made significant strides in developing targeted molecular therapies. These are enabled by the extensive, recently-achieved deciphering of details in the molecular pathology of cancer. Monoclonal antibodies and small-molecule inhibitors have been perfected to target principal molecular pathways underlying these pathologies, but oncological resistance to these therapies continues to routinely emerge in patients. Tumor heterogeneity can explain this ubiquitous emergence of resistant cellular clones; their diversity arises from Darwinian selection and evolution of cellular resistance to therapies. Accordingly, biopsies which generally reflect only part of the tumor provide only partial elucidation of the disease; its microenvironment plays a dominant role in metastasis and disease relapse.

A similar example includes brain diseases, which are estimated to cost the U.S. economy $1.5 trillion per year. This sum underscores the importance of innovating new diagnostics and curative therapies within this realm. However, neurodegenerative diseases, which include Parkinson's diseases and dementia, pose a special challenge. Unlike oncology, the relative inaccessibility of human brain tissues for research precludes the benefits of extensive explorations possible with other more readily-accessible tissues. In this context, analysis methods that can make maximal use of minute tissue samples are beneficial.

Deep proteomic analyses that start by following a top-down approach have many advantages. The more prevalent bottom-up approach to mass spectrometry (MS) begins with a step that fragments species into sizes that are optimal for analysis by conventional MS instruments (small proteins and protein fragments are most suited to conventional MS, as they are more readily transported by ion optics and more easily detected by conventional MS approaches). A combination of high-resolution MS and bioinformatics is then used to identify these fragments and, thereby, deduce the identity of the parent species. However, this approach generally fails in highly heterogeneous mixtures of intact species, where it can become impossible to correctly assign the various fragments to one of the many originating parent species in the original mixture. Sample complexity can grow exponentially in a heterogeneous mixture, such as the cytosol from a single cell, which has over 10,000 distinct proteins expressed with copy numbers from 1 million to below 10. Accordingly, prior to bottom-up MS analysis, laborious purification procedures must be employed to limit the complexity of the initial sample. These protocols can sequester and deplete the rarest analytes.

Embodiments described herein provide new instrumentation for studying proteins. Specifically, embodiments described herein provide techniques for identifying and analyzing intact proteoforms and multiproteoform complexes, and ultimately characterizing their functional states. Embodiments may relate to a singular hybrid instrument that utilizes various elements including: (1) single-molecule analysis of intact analytes using nanoelectromechanical systems (NEMS)-based mass spectroscopy (MS) and inertial imaging, (2) microwave-frequency cavity optomechanics, and (3) state-of-the-art high-resolution Orbitrap mass spectrometry. The described approach offers realistic prospects for automated, high-throughput purification and stratification of intact high-mass species.

In some embodiments of the present disclosure, an instrument for high-throughput single-molecule proteomic analysis that is based upon arrays of NEMS resonators is provided. This instrument enables top-down MS and inertial imaging on individual, intact proteins and multiproteoform complexes followed by high-resolution, bottom-up Orbitrap MS. At present, no technology for deep proteomic profiling of individual cells exists, and no alternate methodology for achieving this has yet been identified. Further, to permit deep proteomic analyses, ideally spanning the nine orders of magnitude in the relative concentrations of critical proteins and multiproteoform assemblies within a mammalian cell, single-molecule resolution may be matched with sample-handling protocols that provide efficient and high-throughput analyte processing to conserve and permit molecular analysis of the rarest species.

The principle of ultrasensitive mass detection via NEMS is as follows. Upon its adsorption onto a nanomechanical resonator, an analyte, which can be a single molecule, multi-proteoform complex, or a nanoparticle, induces a downshift in resonant frequency of the resonator characterized by the formula $$\delta f_n / f_n = -\left(\frac{\delta m}{M}\right)[\phi_n(a)^2 / a_n].$$

Here, $\delta_m$ is the mass of the adsorbed analyte. The resulting fractional frequency shift, $(\delta f_n/f_n)$, is proportional to the fractional mass change, $\delta M/M_{eff}^{(n)}$. The resonant frequency of the $n^{th}$ mechanical mode is $f_n$, $M_{eff}^{(n)}$ is the resonator's effective modal mass, $\delta f_n$ is the mode's frequency shift, $\phi_n$ denotes the mode shape, and a is the position-of-adsorption of the molecule upon the beam (normalized to beam length). The numerical constant an, which depends on mode number, is of order unity. The equation of a single mode shift contains two variables ($\delta_m$ and a). However, by simultaneously tracking shifts from two modes on the same NEMS regarding a landing event, the mass and position of the analyte can be deduced, thereby enabling mass spectrometry on individual analytes. For such analyses, measurement of two modes are sufficient for a doubly-clamped beam, whereas three modes are required for a cantilever.

In some embodiments, an experimental approach is employed in which a NEMS device, or an array of NEMS devices (which can be referred to as "pixels"), are placed in a vacuum chamber, cooled below ambient temperature, and their frequencies continuously tracked with an ultrasensitive electronic readout employing a phase-locked frequency control loop for each pixel. Biomolecules are delivered sequentially to the NEMS pixels, and the induced, temporally abrupt frequency shifts arising from single-molecule physisorption onto the sensors are measured using two (or three) vibrational modes. These frequency shifts can be used to analyze the adsorbing analyte's mass and position.

The resolution of this approach is determined by the mass and position responsivity of the NEMS sensors, their mechanical domain fluctuations, and the noise floor of the readout system. A wide variety of readout approaches can be employed for nanomechanical motion, including piezoresistivity, piezoelectricity, and magnetomotive sensing. For nanodevices useful for biological mass spectrometry, all of these methods of motion transduction may have shortcomings that limit mass resolution to several kDa. In some instances, superconducting cavity optomechanics can be found to be the most sensitive readout scheme, with analyses indicating that it has the potential to enhance single-molecule mass resolution to the 100 Da range. Such resolution is important for transformative applications of NEMS single-molecule analysis to biology, such as deep proteomic profiling. The ultimate, quantum limit for mass sensing at ultralow temperatures has been predicted to be 500 pDa, the mass of an electron.

FIGS. 1A-1D illustrate various example steps for automated stratification of heterogeneous samples using a hybrid NEMS ion trap mass analyzer system 100, in accordance with an embodiment of the present invention. System 100 may include an ion source 114, an ion handling device 106, a mass spectrometer 108, and a NEMS sensor array 102. A description of the functionality of elements included in system 100 may be found in U.S. Pat. No. 10,381,206 entitled "INTEGRATED HYBRID NEMS MASS SPECTROMETRY", the content of which is hereby incorporated by reference.

In reference to FIG. 1A, proteins from a heterogeneous sample 112 are provided to system 100 via ion source 114. In some embodiments, proteins from an unstratified mixture are electrospray ionized and injected into the instrument. In reference to FIG. 1B, ion optics of ion handling device 106 transport the analytes and permit their directly physisorption onto NEMS array 102, which comprises NEMS sensors 104. Coverage is orchestrated to be ~1 protein (or less) on each NEMS resonator of each of NEMS sensors 104. In reference to FIG. 1C, the intact adsorbed proteins are stratified by multi-physical analysis one-by-one by the individual NEMS sensors 104 (or "pixels"). In reference to FIG. 1D, after stratification, the individual strata are sequentially desorbed with concentrations permitting state-of-the-art, top-down Orbitrap proteomic analysis.

Such an approach provides deep top-down proteomic profiling that is based on the automated stratification of heterogeneous samples. By using top-down NEMS-MS, the intact analytes (proteins or multiproteoform complexes) can be processed, stratified (e.g., sorted and grouped), and then strata containing sufficient numbers can be transferred to a state-of-the-art mass spectrometer to facilitate high-resolution, bottom-up proteomic analysis. In effect, NEMS-MS purifies the individual analytes from heterogeneous samples without the need of extremely laborious protocols developed for separating the vast population of proteins from a single cell, thereby avoiding the losses resulting from purification processes.

These considerations motivate the development of NEMS sensor arrays and multiplexed readouts permitting analyses with large numbers (e.g., 1,024) sensor pixels. Large sensor arrays are valuable for achieving sufficient throughput to enable processing over 10's of millions of individual proteins to resolve those in low abundance. Embodiments described herein complement conventional MS methodologies, which provide high resolution for small proteins or protein fragments (mass resolution ~1 mDa; i.e., resolving power of $10^6$ for 1 kDa analytes) when presented in sufficient numbers (~100 copies for Orbitrap MS). Embodiments described herein can realize NEMS resonators providing resolving power of $10^5$ for individual 10 MDa multiproteoform complexes with very high single-analyte throughput.

Figure 2:
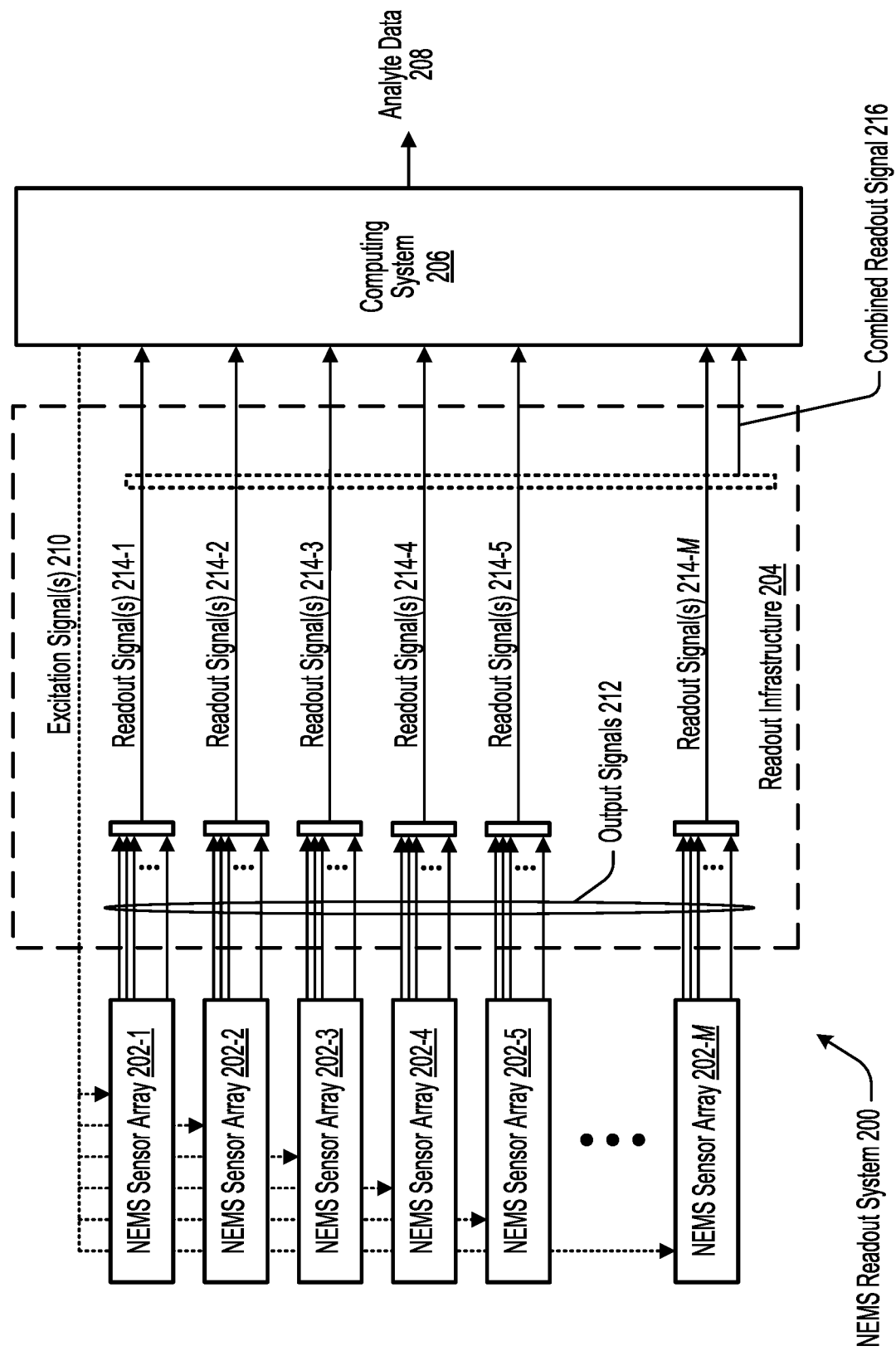
FIG. 2 illustrates a block diagram of a NEMS readout system according to an embodiment of the present invention.

FIG. 2 illustrates a block diagram of a NEMS readout system 200, according to some embodiments of the present disclosure. NEMS readout system 200 may include M NEMS sensor arrays 202, a readout infrastructure 204, and a computing system 206, which may generate analyte data 208 corresponding to one or more analytes that are analyzed by NEMS readout system 200. Computing system 206 may include one or more processors and one or more storage devices. In some embodiments, the processors may execute instructions stored in the storage devices that cause the processors to perform one or more of the operations described herein. In some embodiments, the functionality of computing system 206 may be distributed between various components, such as signal generators (e.g., microwave signal generators, vector radio frequency (RF) signal generators), feedback computers, control computers, and the like.

During operation of NEMS readout system 200, computing system 206 may provide excitation signal(s) 210 to NEMS sensor arrays 202. In one example, computing system 206 may provide a single excitation signal 210 to all of NEMS sensor arrays 202. In another example, computing system 206 may provide different excitation signals 210 to each of NEMS sensor arrays 202, such as a first excitation signal to NEMS sensor array 202-1, a second excitation signal to NEMS sensor array 202-2, and the like.

In response to providing excitation signals 210 to NEMS sensor arrays 202, N output signals 212 may be generated by each of NEMS sensor arrays 202 (e.g., each of NEMS sensor arrays 202 may include N NEMS sensors). Accordingly, the total number of output signals 212 may be equal to M×N. Alternatively, different NEMS sensor arrays 202 may include different numbers of NEMS sensors $N_1, N_2, \ldots, N_M$ and may accordingly generate different numbers of output signals 212 $N_1, N_2, \ldots, N_M$, where $N_1$ is the number of NEMS sensors and output signals 212 in NEMS sensor array 202-1, $N_2$ is the number of NEMS sensors and output signals 212 in NEMS sensor array 202-2, and the like.

Each set of N output signals 212 may be combined into a single readout signal 214, forming a set of M readout signals 214. Readout signals 214 may be fed into computing system 206. Alternatively or additionally, readout signals 214 may be combined into a combined readout signal 216, which may be fed into computing system 206. Each of readout signals 214 and combined readout signal 216 may be collected along a single conductive path (e.g., a wire) that is coupled to computing system 206.

Figure 3:
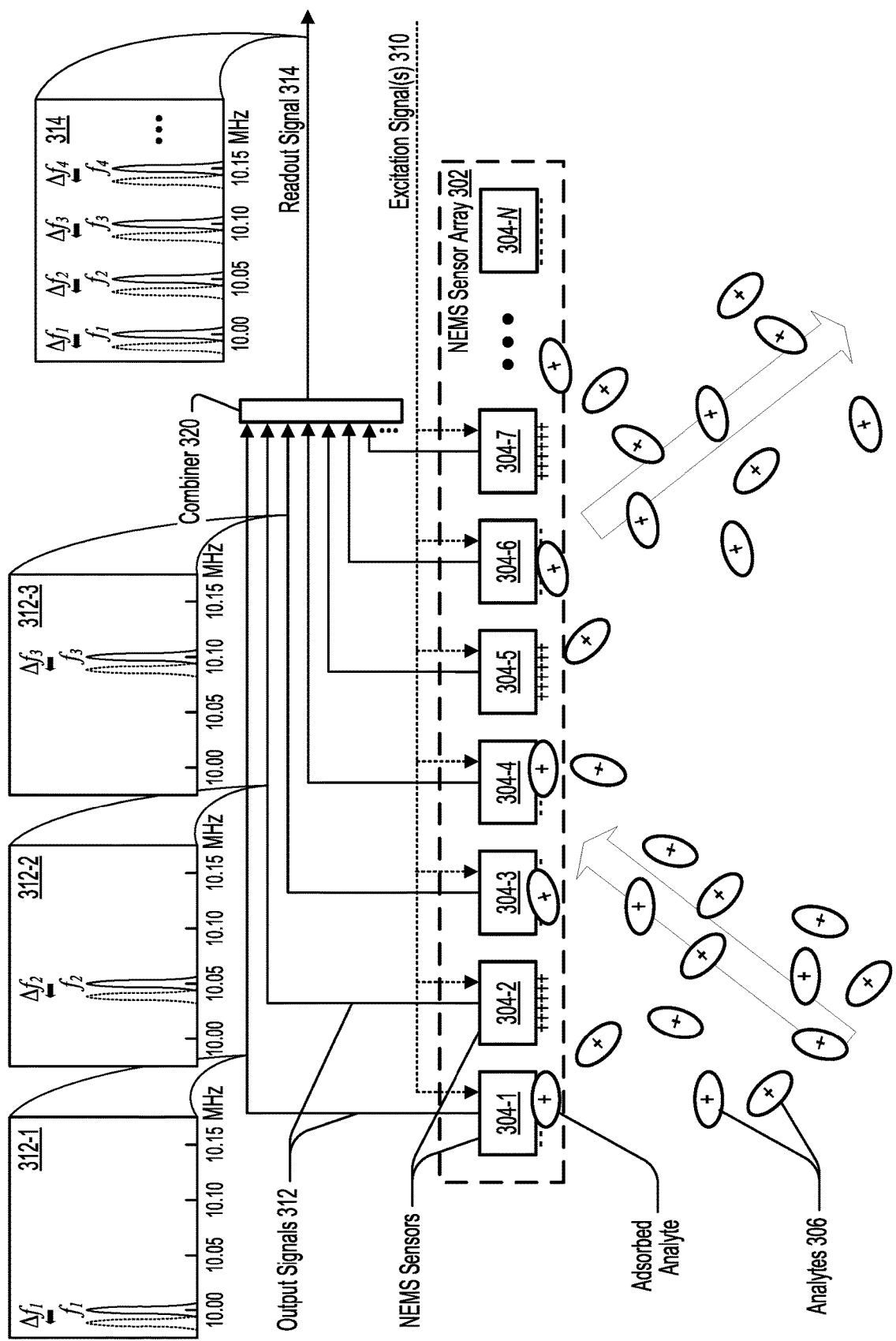
FIG. 3 illustrates an example operation of a NEMS sensor array comprising N NEMS sensors according to an embodiment of the present invention.

FIG. 3 illustrates an example operation of a NEMS sensor array 302 comprising N NEMS sensors 304, according to some embodiments of the present disclosure. Analytes 306 may adsorb onto one or more of NEMS sensors 304 through one of several mechanisms. In the illustrated example, various NEMS sensors 304 may acquire a negative charge so as to create an attractive electrostatic force with positively charged analytes 306, whereas various NEMS sensors 304 may acquire a positive charge so as to create a repulsive force with positively charged analytes 306.

In response to providing excitation signals 310 to NEMS sensor array 302 and NEMS sensors 304, N output signals 312 may be generated by NEMS sensors 304 or, alternatively or additionally, output signals 312 may be collected from NEMS sensors 304. For example, upon collecting a readout signal 314 formed by combining output signals 312 (e.g., using combiner 320), readout signal 314 may be processed to extract output signals 312. In some embodiments, a frequency analysis of readout signal 314 may be performed to extract each of output signals 312.

Each of output signals 312 may include frequency characteristics that are dependent on the resonator of the respective NEMS sensor. For example, the resonator of NEMS sensor 304-1 may have frequency characteristics that may be determined by analyzing output signal 312-1, the resonator of NEMS sensor 304-2 may have frequency characteristics that may be determined by analyzing output signal 312-2, and the like. The frequency characteristics for each of the resonators of NEMS sensors 314 may be different from every other resonator of the remaining NEMS sensors 314 such that an analysis of readout signal 314 and output signals 312 allows each of the frequency characteristics to be distinguished from each other and attributed to the corresponding NEMS sensor.

For example, as shown in the illustrated example, each of output signals 312 may include a peak at a resonant frequency and a corresponding frequency shift of the peak upon adsorption of an analyte to the corresponding NEMS sensor. The frequency shift may start at the resonant frequency and end at a new frequency (e.g., a new resonant frequency) that is lower than the original resonant frequency. This frequency shift may be caused by the increased mass of the resonator upon adsorption of the analyte. In the illustrated example, output signal 312-1 includes a peak at a resonant frequency $f_1$ that shifts to a lower frequency by frequency shift $\Delta f_1$ upon adsorption of an analyte to NEMS sensor 304-1, output signal 312-2 includes a peak at a resonant frequency $f_2$ that shifts to a lower frequency by frequency shift $\Delta f_2$ upon adsorption of an analyte to NEMS sensor 304-2, and the like.

The resonators of NEMS sensors 304 may be designed such that resonant frequency $f_2$ is higher than resonant frequency $f_1$, resonant frequency $f_3$ is higher than resonant frequency $f_2$, and the like. Furthermore, the resonators may be designed such that the resonant frequencies are sufficiently spaced such that the frequency shifts do not cause overlap between any shifted frequencies and any of the resonant frequencies, as will be described in reference to FIGS. 4A and 4B.

Figure 4A:
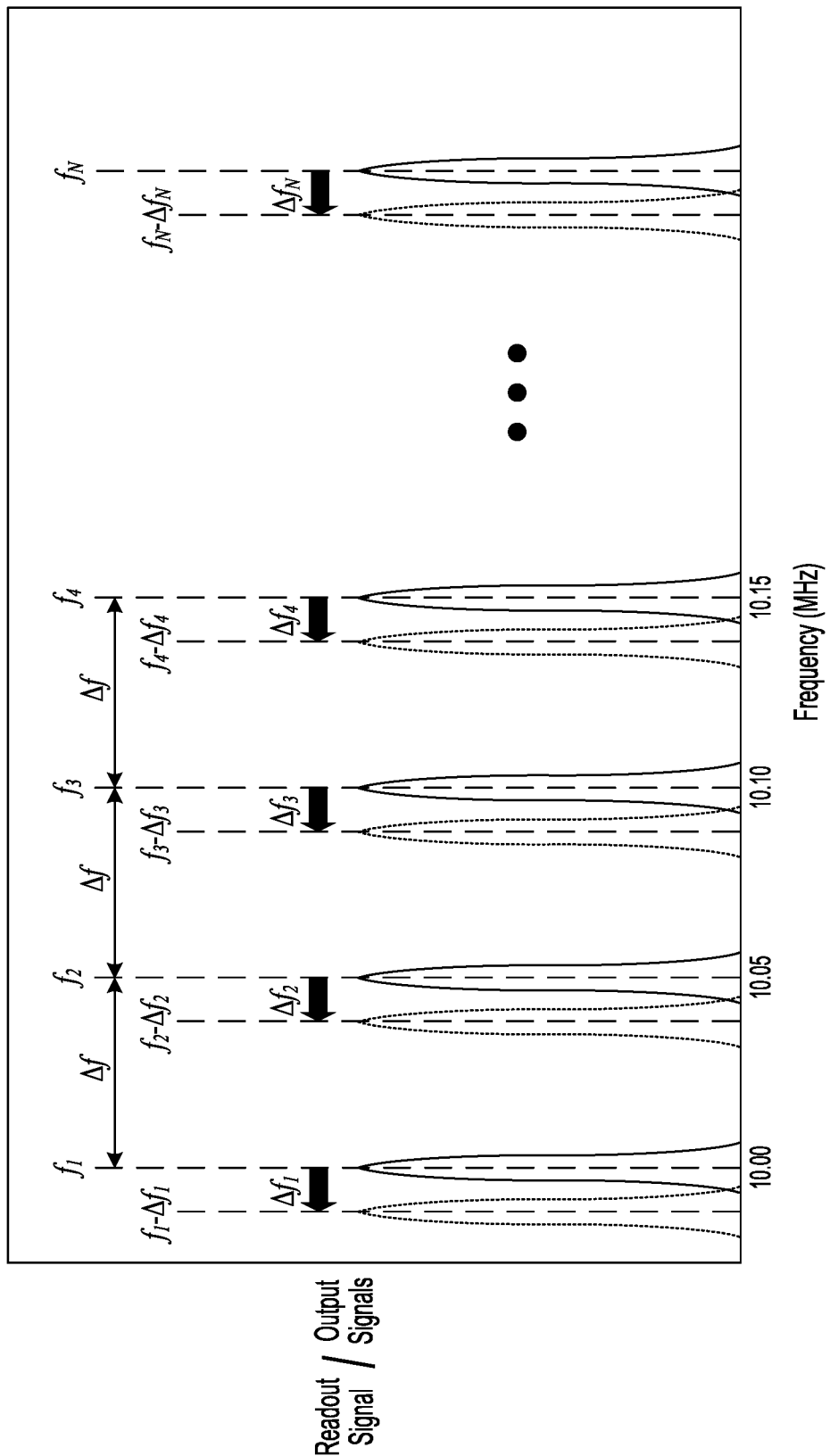
FIGS. 4A and 4B illustrate examples of readout signals (and corresponding output signals) that may be collected by a NEMS readout system according to an embodiment of the present invention.
Figure 4B:
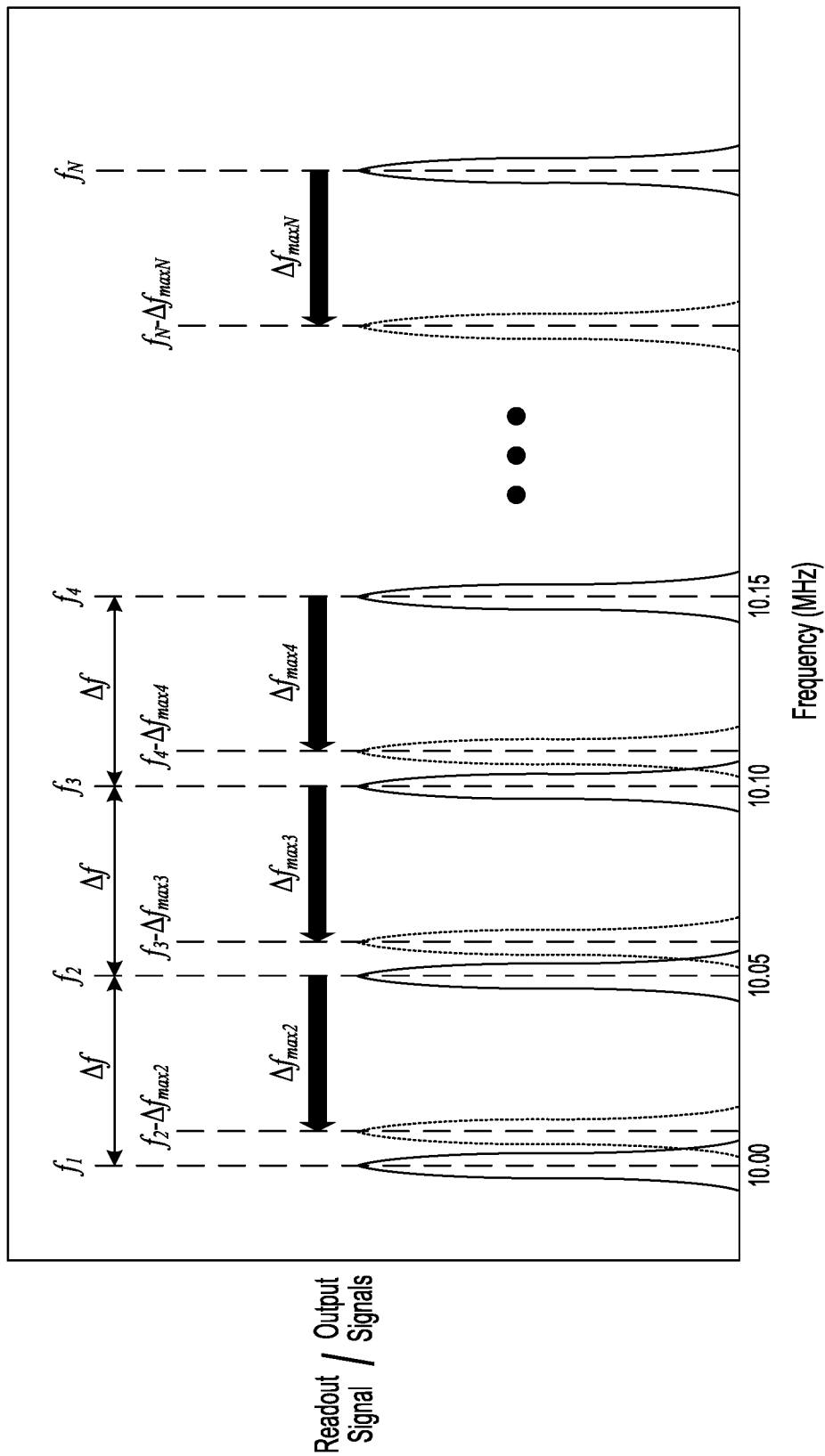

FIGS. 4A and 4B illustrate examples of readout signals (and corresponding output signals) that may be collected by a NEMS readout system, according to some embodiments of the present disclosure. In reference to FIG. 4A, the illustrated example of a collected readout signal shows contributions of multiple output signals. For example, a first peak centered at resonant frequency $f_1$ may be shifted downward by $\Delta f_1$ to a new frequency $f_1 - \Delta f_1$, a second peak centered at resonant frequency $f_2$ may be shifted downward by $\Delta f_2$ to a new frequency $f_2 - \Delta f_2$, and the like. A spacing $\Delta f$ between the resonant frequencies may be employed to allow sufficient space for frequency shifts of the resonant frequencies without overlap between adjacent peaks such that individual peaks may be resolved.

In reference to FIG. 4B, a maximum frequency shift for each of the resonant frequencies is shown such that adjacent peaks do not overlap. For example, the second peak centered at resonant frequency $f_2$ may be shifted downward by a maximum of $\Delta f_{max2}$ before the second peak overlaps with the first peak, the third peak centered at resonant frequency $f_3$ may be shifted downward by a maximum of $\Delta f_{max3}$ before the third peak overlaps with the second peak, and the like. In some embodiments, spacing $\Delta f$ between the resonant frequencies may be determined based on the desired maximum frequency shifts $\Delta f_{max2}$, $\Delta f_{max3}$, ..., $\Delta f_{maxN}$. The NEMS sensors may be designed accordingly to achieve spacing $\Delta f$.

Figure 5:
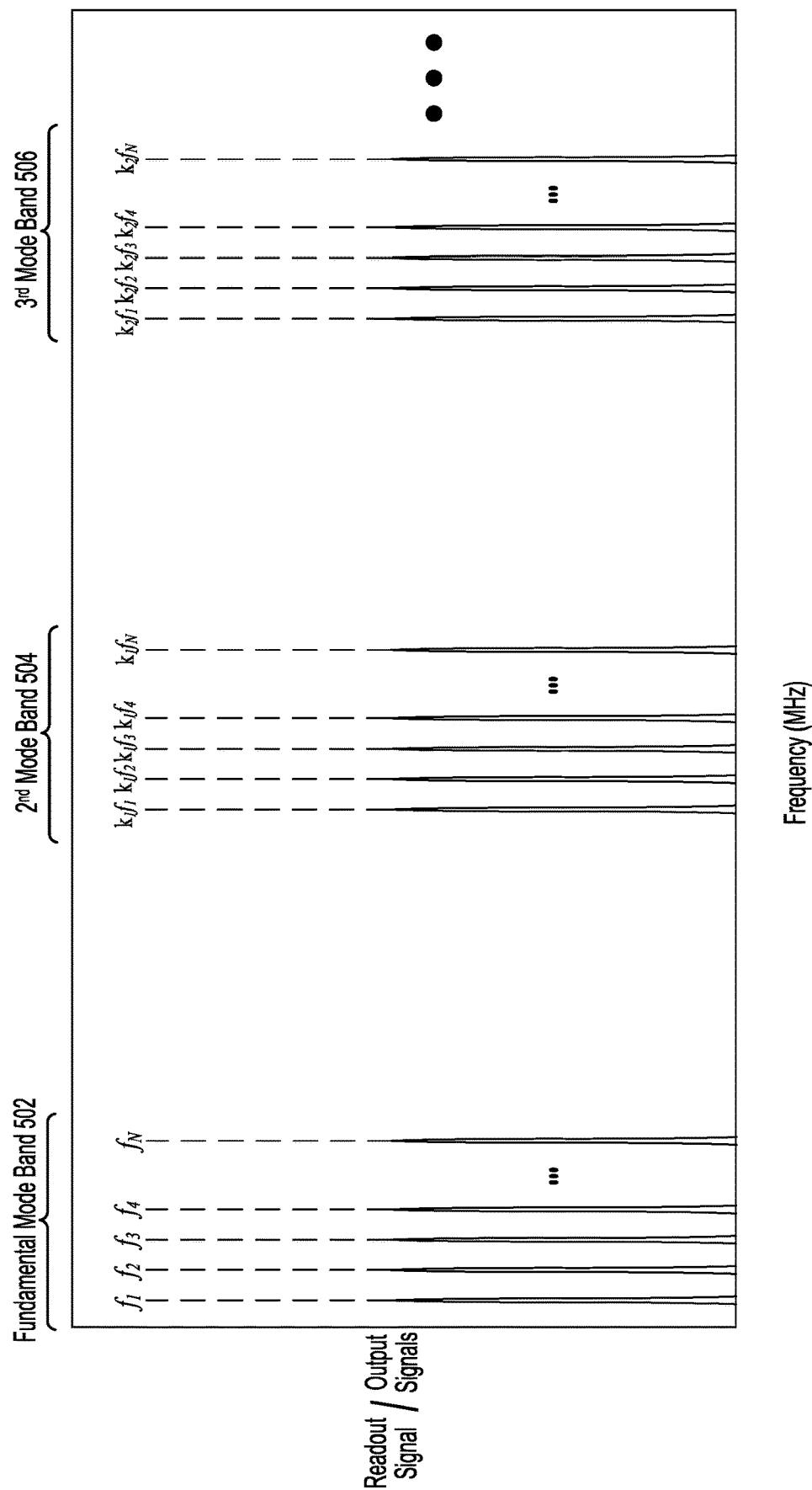
FIG. 5 illustrates an example of a readout signal (and corresponding output signals) that may be collected by a NEMS readout system according to an embodiment of the present invention.

FIG. 5 illustrates an example of a readout signal (and corresponding output signals) that may be collected by a NEMS readout system, according to some embodiments of the present disclosure. In the illustrated example, a first set of resonant frequencies $f_1, f_2, \ldots, f_N$ may form a fundamental mode band 502, a second set of resonant frequencies $k_1 f_1, k_1 f_2, \ldots, k_1 f_N$ related to the first set of resonant frequency by the scalar $k_1$ may form a second mode band 504, and a third set of resonant frequencies $k_2 f_1, k_2 f_2, \ldots, k_2 f_N$ related to the first set of resonant frequency by the scalar $k_2$ may form a third mode band 506. The spacing between resonant frequencies may also increase with mode number. For example, resonant frequencies in fundamental mode band 502 may be spaced by $\Delta f$, resonant frequencies in second mode band 504 may be spaced by $k_1 \Delta f$, and resonant frequencies in third mode band 506 may be spaced by $k_2 \Delta f$.

Figure 6:
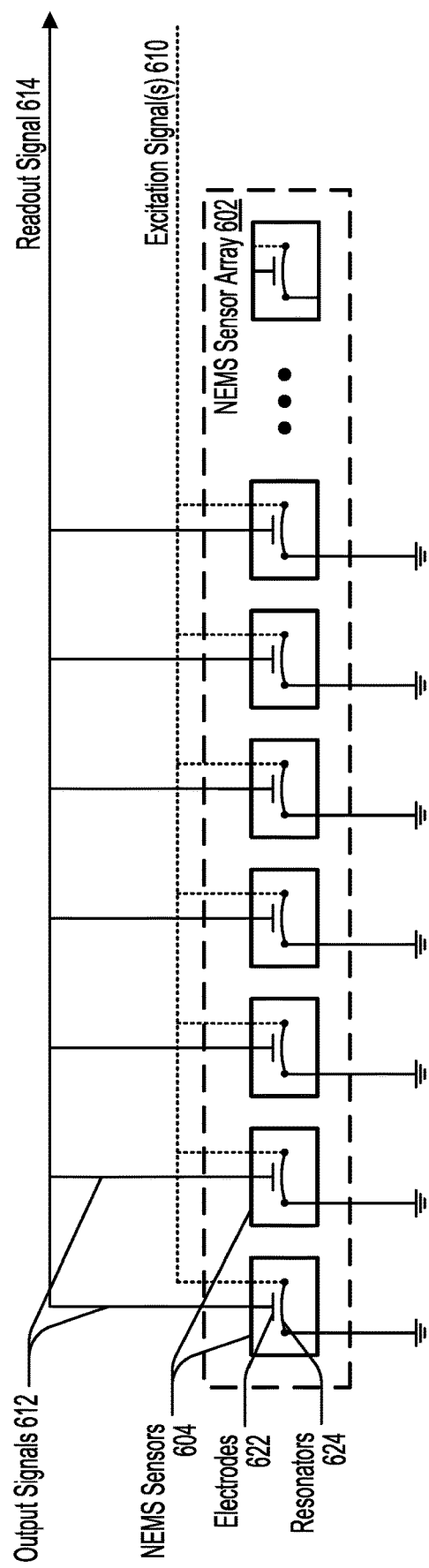
FIG. 6 illustrates an example of a NEMS sensor array including NEMS sensors. according to an embodiment of the present invention

FIG. 6 illustrates an example of a NEMS sensor array 602 including NEMS sensors 604, according to some embodiments of the present disclosure. Each of NEMS sensors 604 may include a resonator 624 placed near an electrode 622, from either of which an output signal 612 may be carried along a conductive path to a computing system. Output signals 612 may be generated by NEMS sensors 604 and/or be collected from NEMS sensors 604 by the computing system. Because output signals 612 may be combined into a readout signal 614, the computing system may collect and process readout signal 614 to extract/collect output signals 612.

The frequency characteristics of each resonator 624 may be based on the resonator's physical dimensions. Resonator 624 may be a cantilever or a doubly clamped beam, among other possibilities. In the illustrated example, each of resonators 624 comprise doubly clamped beams placed near, but not in contact with electrode 622. Resonators 624 and electrodes 622 may be placed parallel to each other such that portions of resonators 624 may move toward and away from electrodes 622 while experiencing vibrational motion (e.g., resonating). In some embodiments, resonators 624 may resonate in response to an excitation signal 610 being provided to NEMS sensors 602. In some embodiments, resonators 624 may resonate regardless of the presence of excitation signal 610. In some embodiments, providing excitation signal 610 to NEMS sensors 602 may cause increased movement of resonators 624 and an increased magnitude of output signals 612.

In the illustrated example, each of resonators 624 comprises a doubly clamped beam connected to ground at one end and connected to a conductive path on the other end from which excitation signal 610 is received, and each of resonators 624 is spaced apart from a corresponding electrode 622 from which output signal 612 is carried. Other configurations, alternatives, and modifications to NEMS sensor array 602 are contemplated and are considered within the scope of the present disclosure, in any of which output signals 612 are indicative of the frequency characteristics of resonators 624. For example, in various embodiments, excitation signal 610 may be provided to electrodes 622 in addition to or instead of resonators 624, excitation signal 610 may be provided to both ends of resonators 624, resonators 624 may not be connected to ground at either end of the doubly clamped beam, resonators 624 may be connected to ground at a midpoint, and the like.

Figure 7:
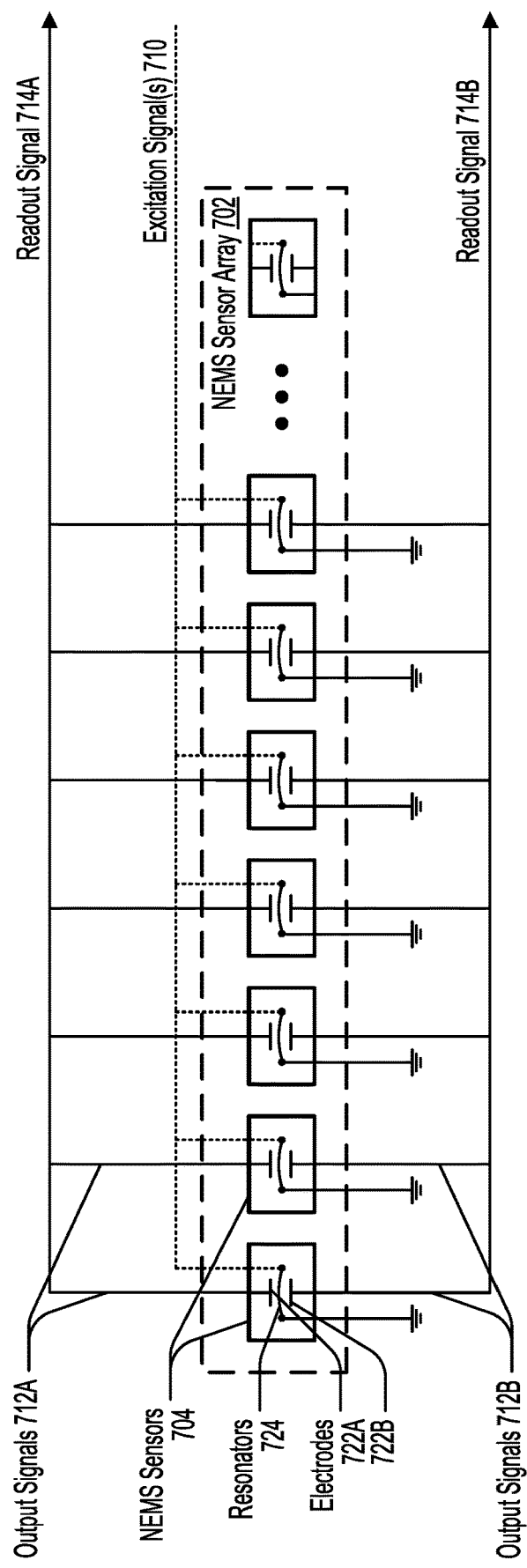
FIG. 7 illustrates an example of a NEMS sensor array including NEMS sensors according to another embodiment of the present invention.

FIG. 7 illustrates an example of a NEMS sensor array 702 including NEMS sensors 704, according to other embodiments of the present disclosure. Each of NEMS sensors 704 may include a resonator 724 placed near an upper electrode 722A and a lower electrode 722B. Upper output signals 712A may be carried along a conductive path (corresponding to an upper readout signal 714A) from upper electrodes 722A and lower output signals 712B may be carried along a conductive path (corresponding to a lower readout signal 714B) from lower electrodes 722B. In some embodiments, upper and lower output signals 712A and 712B may be used for different modes or for the same modes. For example, upper readout signal 714A may be analyzed to identify resonant frequencies in the fundamental mode and lower readout signal 714B may be analyzed to identify resonant frequencies in the second mode.

In the illustrated example, each of resonators 724 comprises a doubly clamped beam connected to ground at one end and connected to a conductive path on the other end from which an excitation signal 710 is received, and each of resonators 724 is spaced apart from corresponding electrodes 722A and 722B from which output signals 712A and 712B are carried. Other configurations, alternatives, and modifications to NEMS sensor array 702 are contemplated and are considered within the scope of the present disclosure, in any of which output signals 612 are indicative of the frequency characteristics of resonators 724. For example, in various embodiments, excitation signal 710 may be provided to electrodes 722 in addition to or instead of resonators 724, excitation signal 710 may be provided to both ends of resonators 724, resonators 724 may not be connected to ground at either end of the doubly clamped beam, resonators 724 may be connected to ground at a midpoint, and the like.

Figure 8:
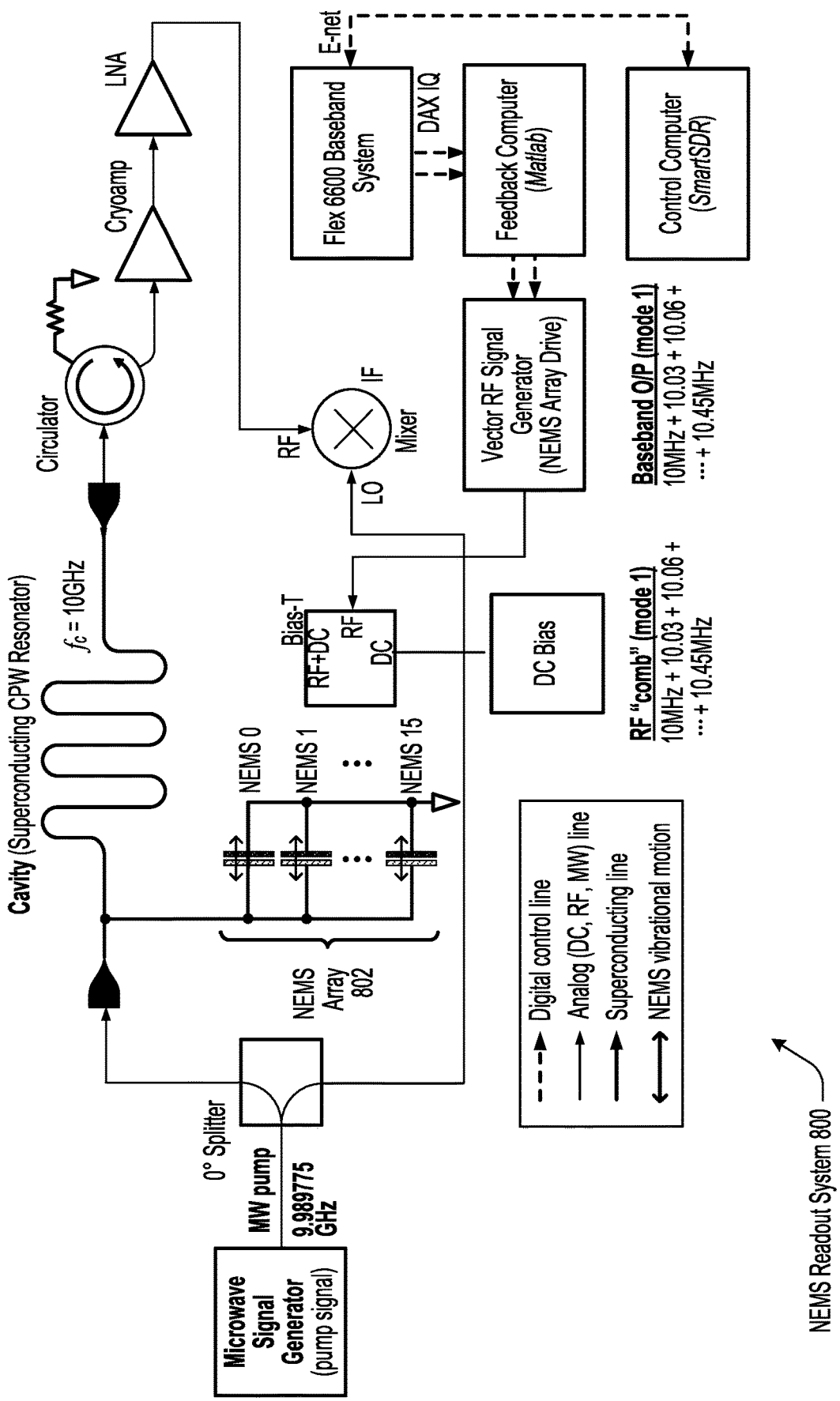
FIG. 8 illustrates an example of a NEMS readout system including a NEMS sensor array according to yet another embodiment of the present invention.

FIG. 8 illustrates an example of a NEMS readout system 800 including a NEMS sensor array 802, according to yet other embodiments of the present disclosure. NEMS sensor array 802 includes various NEMS sensors that are represented as capacitors with gap spacing changing at RF, thereby frequency modulating the microwave cavity resonance.

In some embodiments, two dedicated computers, including a feedback computer and a control computer, may be employed; the first being a feedback computer that enables realizing independent, phase-locked feedback control of the 16 NEMS resonators (via, e.g., custom MATLAB scripts), and the second being a control computer that provides control for the Flex 6600 baseband system (via, e.g., SmartSDR). These computers can be used to realize a multiplexed PLL control system. For example, in some embodiments, not only can the fundamental modes of each of the NEMS array elements be phase locked, but also three higher modes, for a total of four modes per NEMS resonator. In some embodiments, four IQ outputs of a radio server (e.g., a single Flex 6600 available from FlexRadio of Austin Tex.) can be used.

Figure 9:
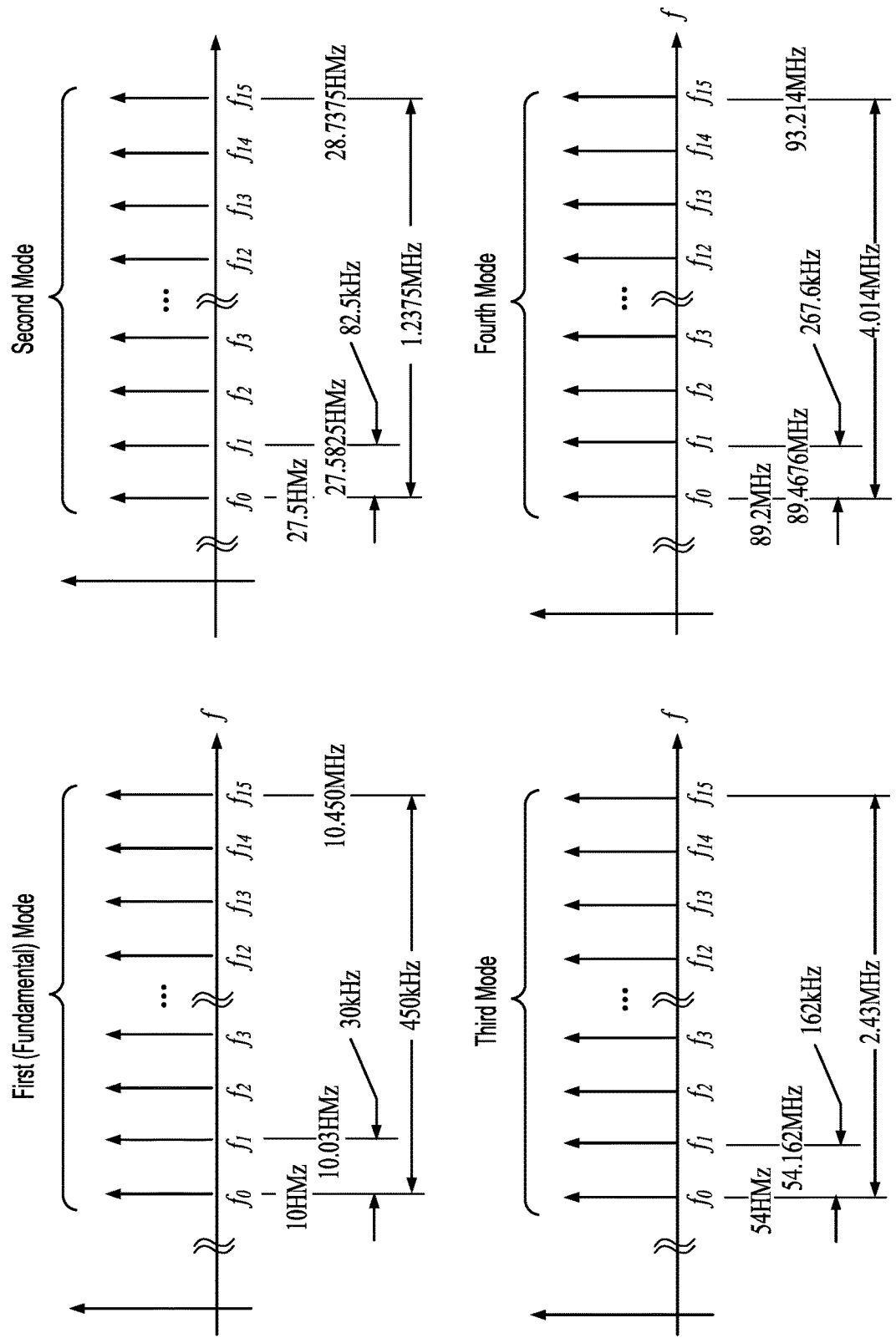
FIG. 9 illustrates an example of different modes that can be extracted using a NEMS readout system according to an embodiment of the present invention.

FIG. 9 illustrates an example of the different modes that can be extracted using a NEMS readout system, according to some embodiments of the present disclosure. In the illustrated example, predicted frequency combs for the first four modes of 16 frequency-staggered (evenly spaced) NEMS resonators are shown. In some embodiments, the spacing of the resonances increases with mode number, in direct proportion to the frequency increase between modes. In the illustrated example, the frequency spans for the family of 16 resonators are, for the first four modes: 0.45 MHz, 1.2375 MHz, 2.43 MHz, and 4.014 MHz respectively. Thus, these are the slice bandwidths used to read out the entire array of devices for modes 1 through 4.

In reference to FIG. 8, the radio server (e.g., Flex 6600) can be configured to cover four slices as shown in FIG. 9, corresponding the frequency bands in which these family of modal resonances occur. This can be accomplished by processing four independent IQ streams in the feedback computer(s), create the feedback control signals, subsequently combine these control signals, and then port them to the input of the vector signal generator(s) to create the complete family of requisite RF/VHF feedback signals to drive the NEMS. Alternatively, four vector signal generators may be used for each of the IQ streams, and subsequently combined before delivery to the mixer.

Figure 10A:
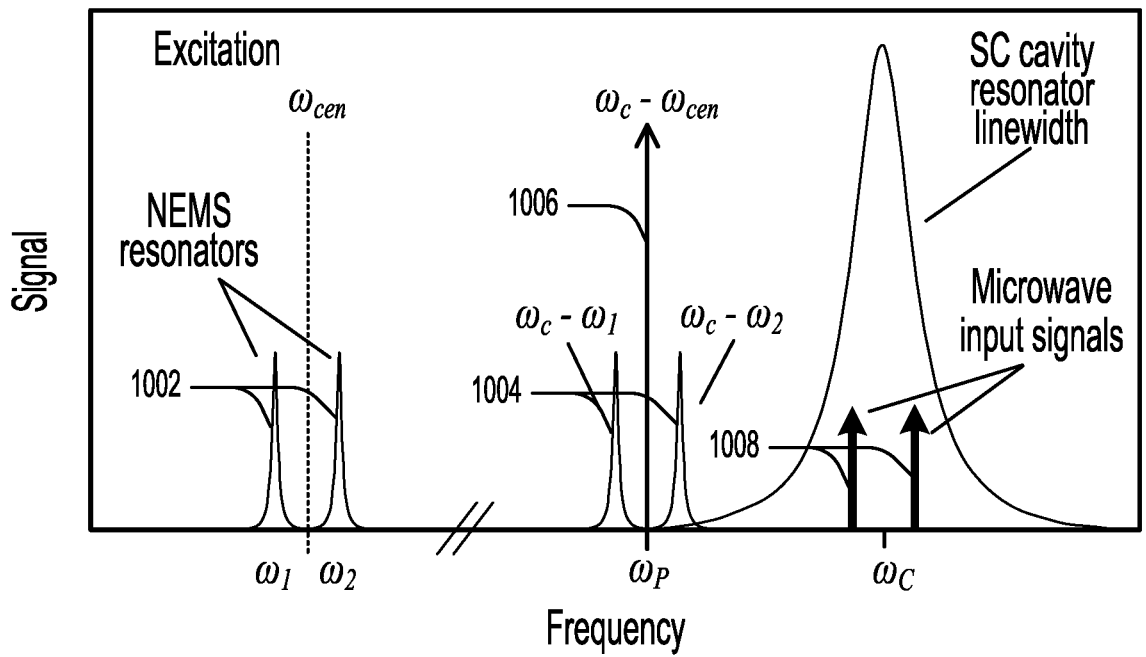
FIGS. 10A and 10B illustrate examples of excitation and detection schemes, respectively, for an array of two NEMS resonators according to an embodiment of the present invention.
Figure 10B:
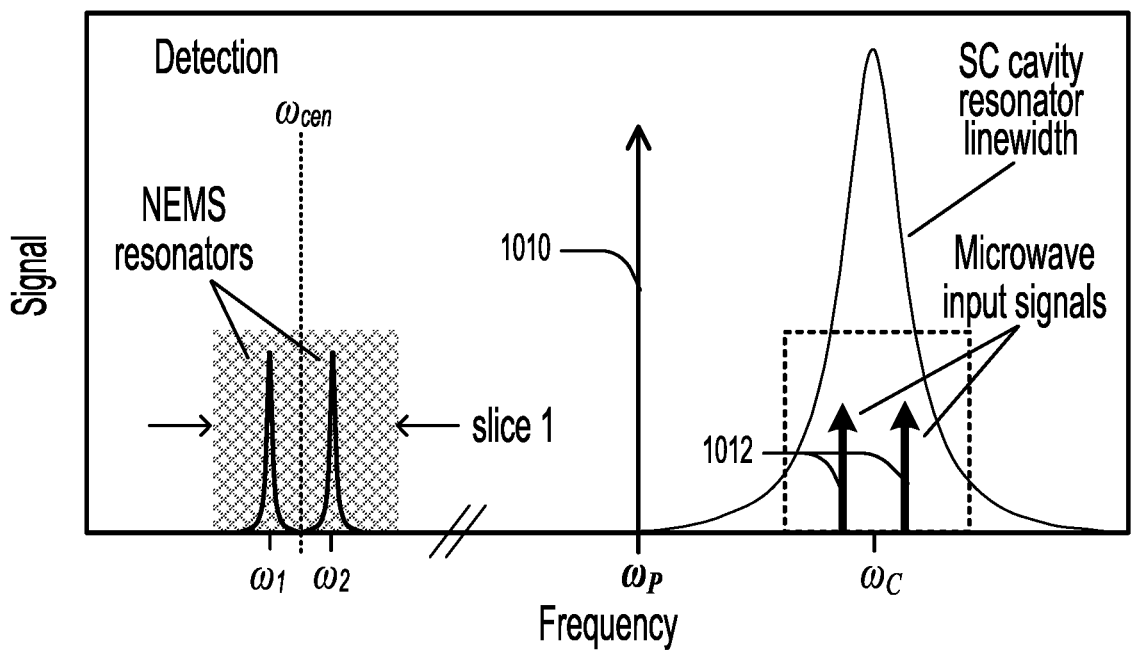

FIGS. 10A and 10B illustrate examples of excitation and detection schemes, respectively, for an array of two NEMS resonators, according to some embodiments of the present disclosure. In reference to FIG. 10A, two NEMS resonators vibrating in the high frequency (HF) range (indicated by 1002) create cavity susceptibility at microwave frequencies (indicated by 1004). A microwave pump tone downshifted from the cavity resonance by the average frequency of the NEMS array (indicated by 1006) nonlinearly combines with the NEMS signal at RF to parametrically pump the cavity within its linewidth (indicated by 1008).

In reference to FIG. 10B, detection of these NEMS-induced microwave tones within the cavity linewidth is achieved by using the same pump tone (indicated by 1010), which was initially used to excite the cavity susceptibility, as described above, to downconvert these NEMS-induced cavity resonances (indicated by 1012) back to the RF baseband. The Flex 6600 slice is then centered about these baseband RF signals to permit their detection.

Figure 11:
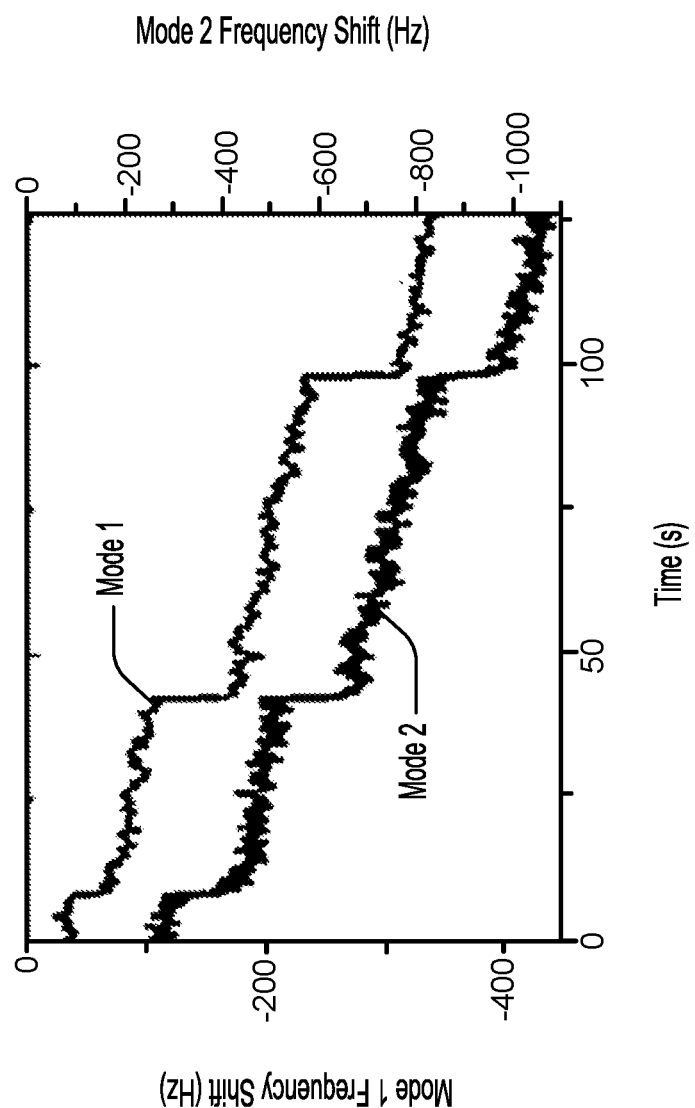
FIG. 11 illustrates a plot showing frequency shifts for the detection of human IgM antibodies using NEMS devices according to an embodiment of the present invention.

FIG. 11 illustrates a plot showing frequency shifts for the detection of human IgM antibodies using NEMS devices. Raw data is illustrated exemplifying the time-correlated frequency shifts induced in the first two mechanical displacement modes of a NEMS resonator in response to a sequence of single-molecule adsorption events. Individual IgM particles landing on a doubly-clamped nanomechanical beam resonator produce abrupt shifts in the first and second mechanical modes.

Figure 12:
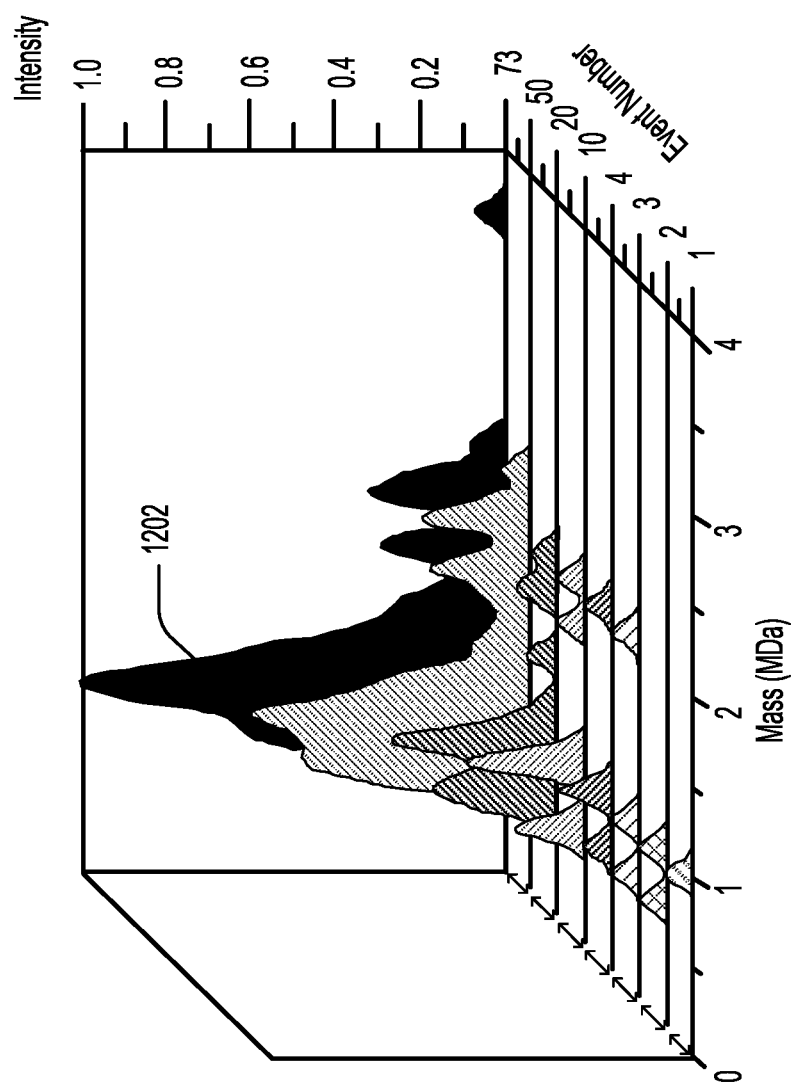
FIG. 12 illustrates a plot showing a mass spectrum for the detection of human IgM antibodies using NEMS devices and a mass spectrometer according to an embodiment of the present invention.

FIG. 12 illustrates a plot showing a mass spectrum for the detection of human IgM antibodies using NEMS devices and a mass spectrometer. By individually measuring the mass of the sequentially arriving particles, a mass spectrum representing the entire heterogeneous sample can be constructed. Different molecular isoforms accumulate at their respective mass values. The sum spectrum 1202 combined from all 74 events has readily identifiable peaks corresponding to major isoforms of IgM typically found in human serum.

Figure 13:
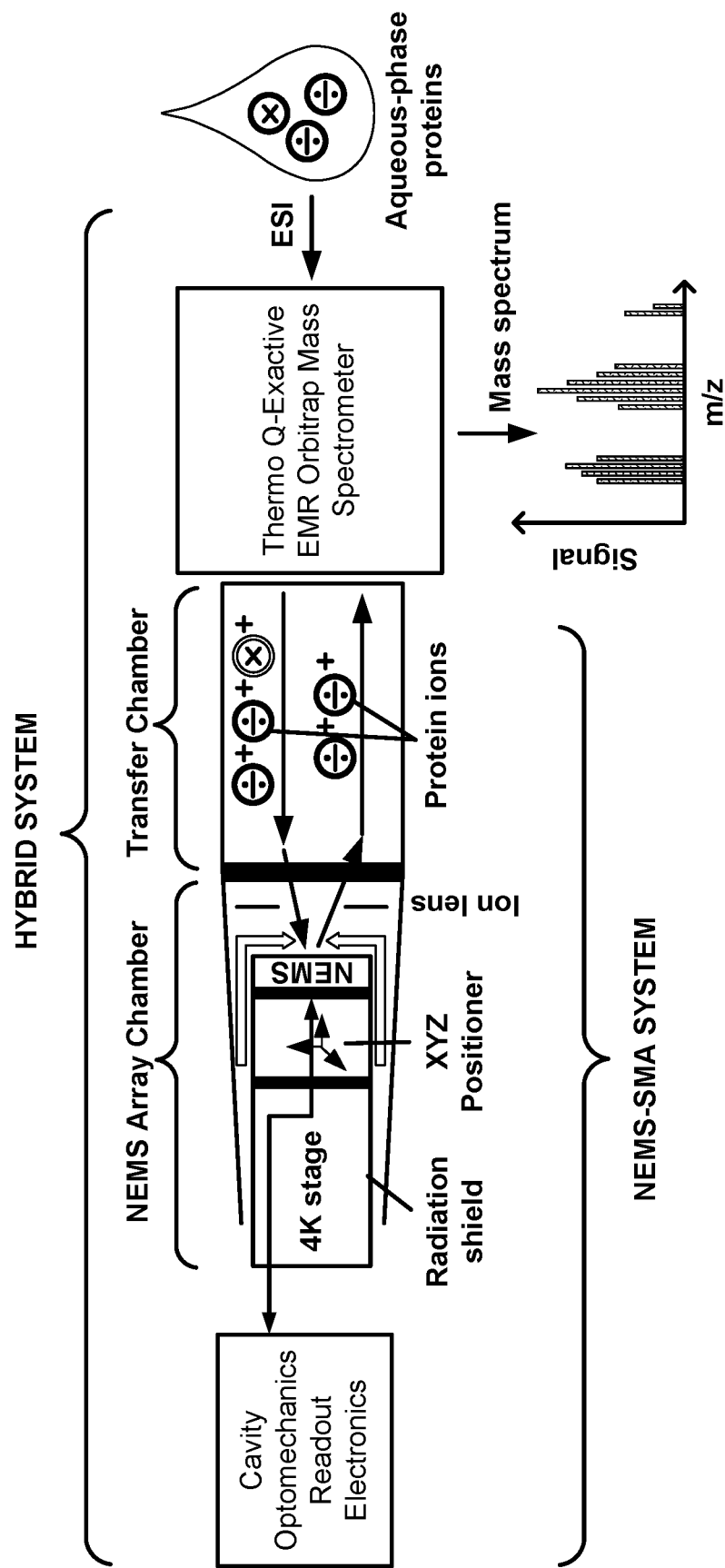
FIG. 13 illustrates an example implementation of a hybrid system with cavity optomechanics readout electronics according to an embodiment of the present invention.

FIG. 13 illustrates an example implementation of a hybrid system with cavity optomechanics readout electronics, according to some embodiments of the present disclosure. The illustrated hybrid instrument comprises the Thermo Q-Exactive EMR (extended mass range) mass spectrometer with ESI sample injection, vacuum-based ion optics connecting the Orbitrap MS to the NEMS chamber, and ion optics for a cryogenic NEMS stage with a precision XYZ translator.

Figure 14:
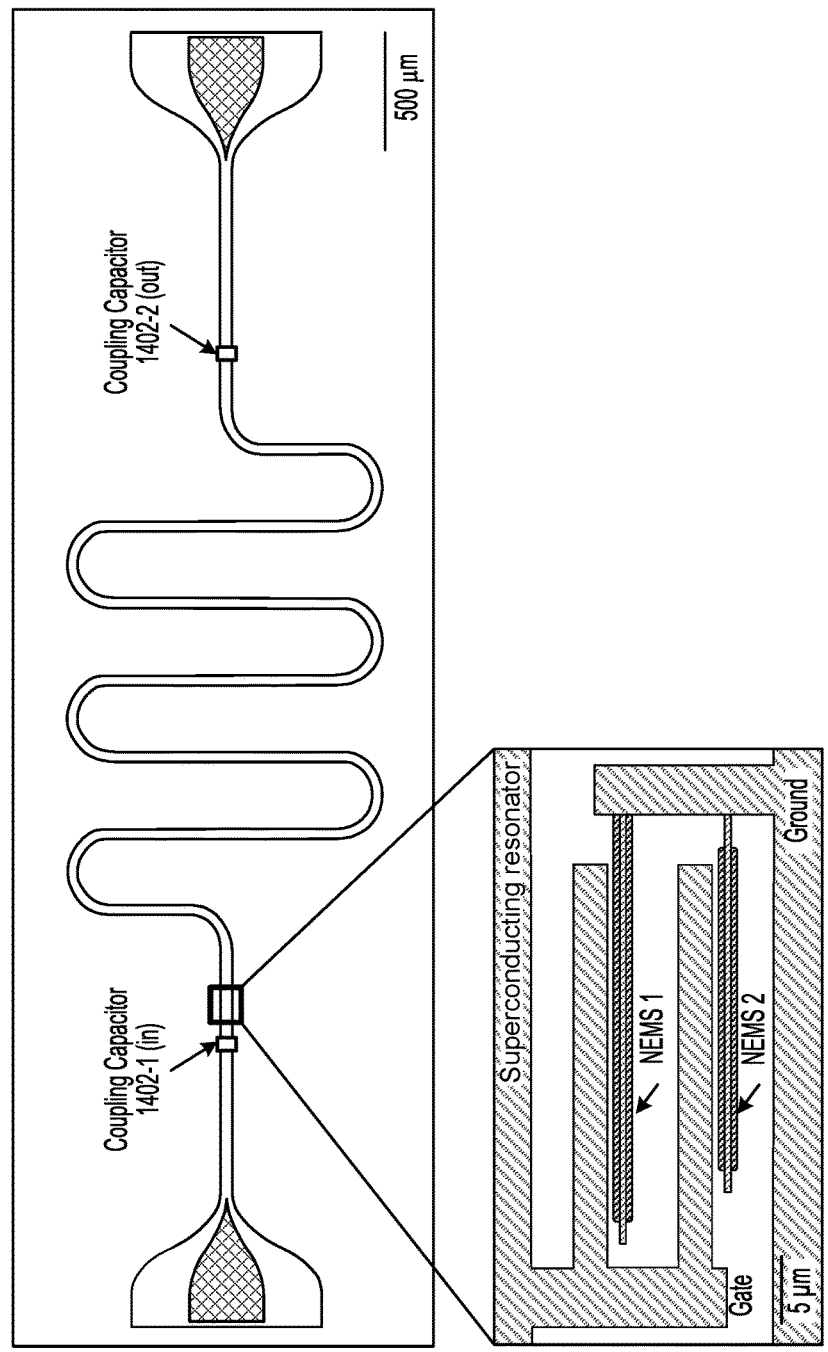
FIG. 14 illustrates an example implementation of a NEMS array system and a superconducting cavity according to an embodiment of the present invention.

FIG. 14 illustrates an example implementation of a NEMS array system and a superconducting cavity, according to some embodiments of the present disclosure. The length of cavity 1402 is determined by the locations of coupling capacitors 1402. The NEMS may be located immediately past incoming coupling capacitor 1402-1. The NEMS may be doubly clamped, suspended beams of slight difference in dimension. The gate may senses the motion of the beam capacitively and is also used for actuation.

In some embodiments, a compound Type-II superconductor, niobium nitride (NbN), which has a transition temperature of 16.5K and which will permit operation using NEMS-array stage cooled a closed-cycle refrigerator may be employed. Operation in the 6K to 8K range may provide the profound sensitivity increases available from a cavity optomechanical readout, while keeping the system design straightforward and cost-effective. The illustrated example shows a meandering NbN half-wave stripline resonator that is ~1 cm long and is configured as a coplanar waveguide. The stripline resonator is connected to external circuitry through two coupling capacitors. To achieve critical coupling, these capacitors may be ~20 fF, allowing preservation of an excellent electrical quality factor of ~10,000, while providing minimal insertion loss (<3 dB).

Near the input of the strip line resonator, a gate is positioned next to an array of doubly clamped beam NEMS devices, each of which is configured with a superconducting electrode that may be electrically grounded. This gate electrode-NEMS complex forms a vacuum-gap capacitor with static capacitance on the order of ~500 aF for a readily-achievable gap of about ~50 nm. NEMS resonant motion may minutely modulate the gap distance and, at the NEMS onset of mechanical nonlinearity (~1 nm), thereby result in ~5 aF temporal modulation of the gap capacitance. This motional capacitance of the NEMS is very small compared to the capacitance of both the static gate and the stripline resonator. Accordingly, modest but sufficient electromechanical coupling, on the order of ~~6 kHz/nm, can be achieved.

Figure 15:
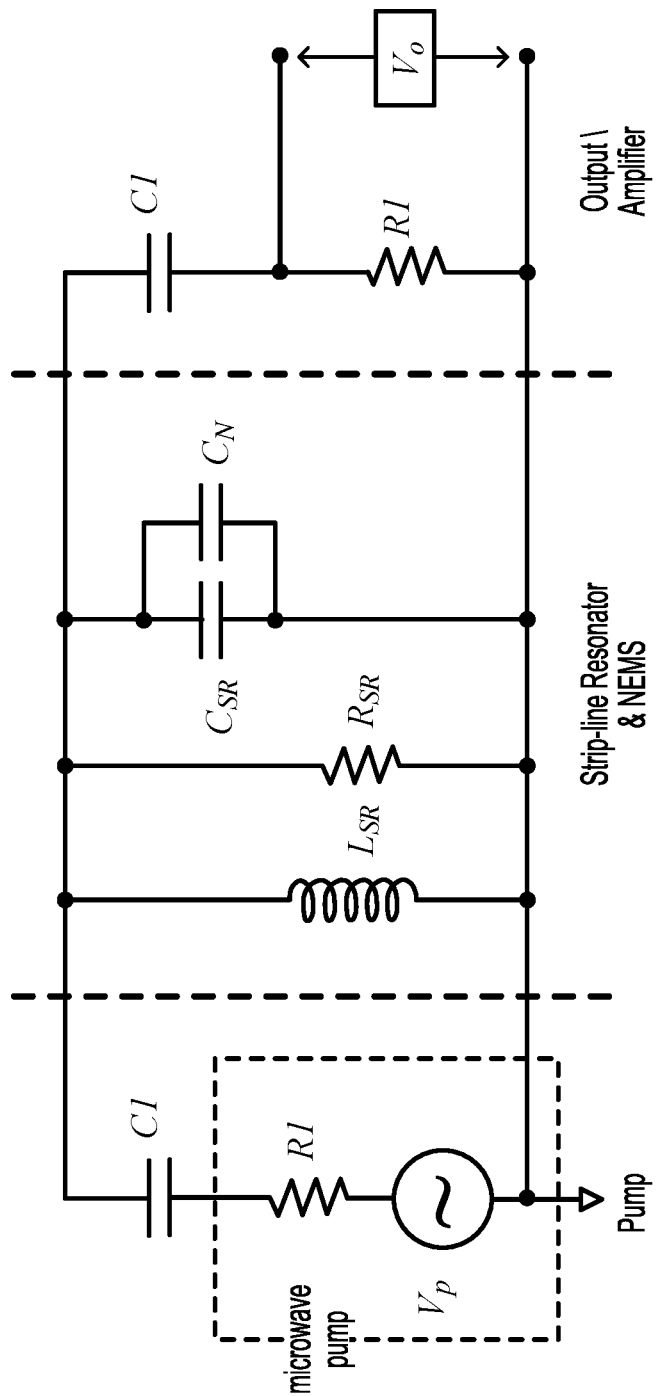
FIG. 15 illustrates an equivalent electrical circuit of the NEMS-cavity system illustrated in FIG. 14.

FIG. 15 illustrates an equivalent electrical circuit of the NEMS-cavity system illustrated in FIG. 14. In some embodiments, the circuit may be based on parameters acquired from simulations (e.g., Sonnet Suite for electromagnetic analysis, COMSOL Multiphysics for the mechanical domain analysis, etc.). For example, a NEMS doubly clamped beam with a 10 μm length and 100 nm width patterned from of a bilayer of NbN (~20 nm thick top superconducting electrode) and silicon nitride (~50 nm thick, structural layer) may have has a mechanical resonant frequency of ~6 MHz and a quality factor at 4K of ~100 k.

The 6 GHz strip-line resonator (with a loaded Q of ~10 k) may be electrically loaded at 5.994 GHz. This pump frequency, which is one NEMS resonant frequency below the cavity resonance, is approximately ten linewidths away from the cavity resonance. Hence, the pump alone may not excite the cavity. Resonant NEMS motion at the gate electrode, however, electrically multiplies with the pump excitation to generate a sideband at the 6 GHz cavity resonance frequency (=5.994 GHz+0.006 GHz), thus exciting the superconducting cavity. By (separately) piezoelectrically driving the NEMS to its onset of nonlinearity, which corresponds to a displacement of ~1 nm, a 5 mV electrical pump yields an electrically-transduced mechanical response signal of order 1 μV. Cryogenically cooled readout amplifiers at 6K may provide a noise temperature of <5K, corresponding to a voltage noise of ~100 pV/Hz$^{1/2}$ at 50Ω. As a result, for the aforementioned doubly-clamped beam displacement sensing is limited only by thermomechanical noise, which is of order ~600 fm/Hz$^{1/2}$ (at 6K).

The mass sensitivity for the first iteration of device may then be determined as $\Delta m=(1/(2Q_m))(m\Delta x/x)\sim 500$ Da, where m and $Q_m$ are the mass and quality factor of the mechanical resonator, $\Delta x$ is the thermomechanical noise and x is the displacement at the onset of nonlinearity. This is a significant improvement over previous piezoresistive devices (~75 kDa resolution). Reduction of the device mass, improvement in electromechanical coupling, and the use of cantilever (which allows much larger amplitude before onset of nonlinearity) can improve resolution to <100 Da.

Accordingly, cavity optomechanics provides high-throughput, high-sensitivity single-molecule analysis. The reasons behind this are twofold. First, the stripline resonator resonantly acts to enhance the NEMS-motion-induced signal with minimal background. Second, this readout scheme can require extremely low power: a 5 mV pump signal yields stored cavity energy only of order ~80 aJ (cavity occupation ~20×10$^6$ photons). In contrast, ohmic dissipation that profoundly limits piezoresistive transduction schemes generally makes it very hard to cool optimally-biased NEMS devices below ~40K. Accordingly, the advantages of low-temperature operation are inaccessible.

Figure 16:
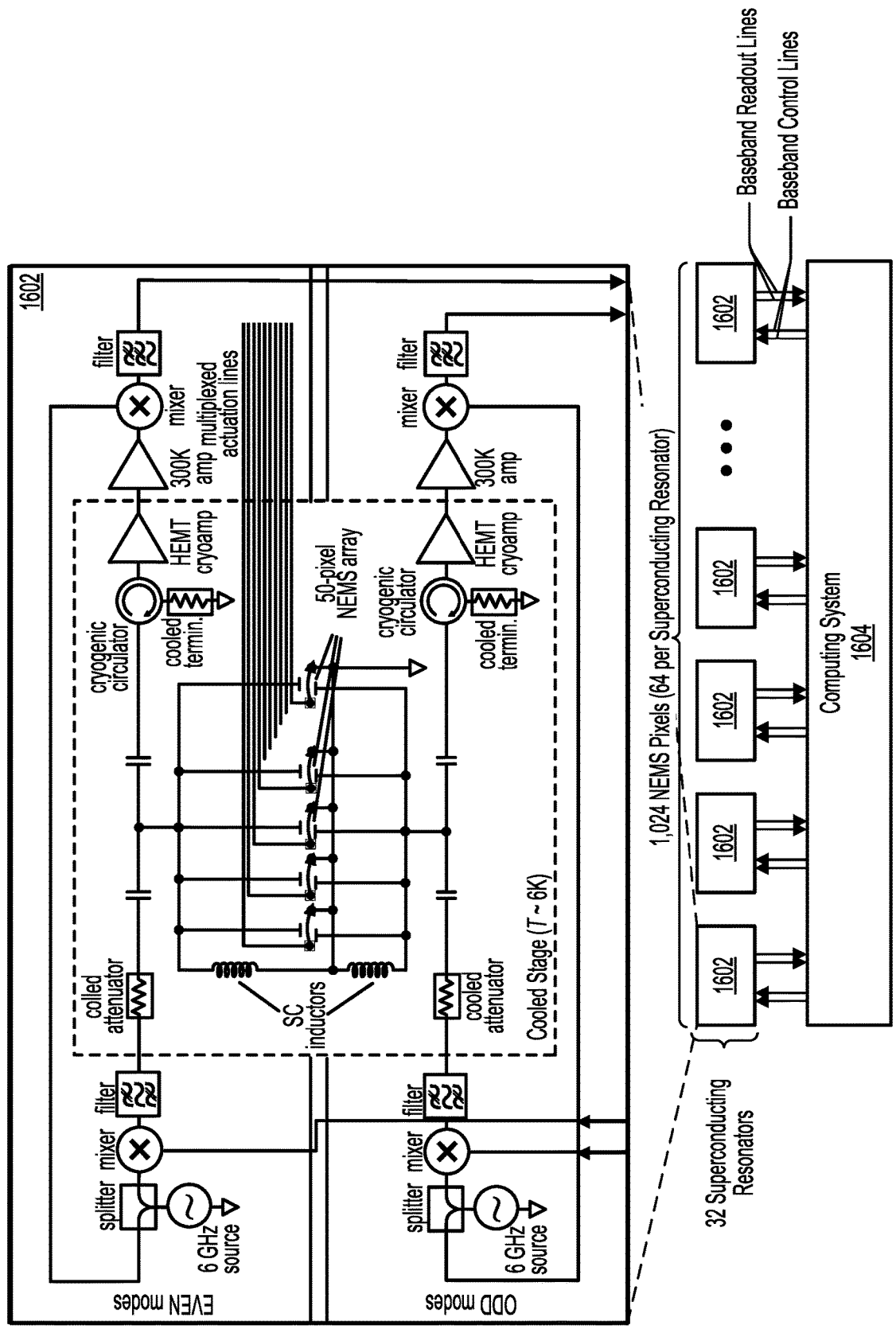
FIG. 16 illustrates a 1,024-pixel NEMS single-molecule analysis readout system employing superconducting cavity optomechanics according to an embodiment of the present invention.

FIG. 16 illustrates a 1,024-pixel NEMS single-molecule analysis readout system employing superconducting cavity optomechanics, according to some embodiments of the present disclosure. In some embodiments, an arbitrary waveform generator is used to generate a complex waveform to actuate all NEMS elements by piezoelectric actuation at their resonant frequencies. A DC bias, ~1 to 15 V can permit optimal capacitive actuation. An RF pump from a signal generator, which operates below the cavity resonance frequency, may be stepped to achieve parametric pumping via the mechanical resonance. In some embodiments, all 50 mechanical tones (for the 50-pixel NEMS array) fit within one cavity linewidth, allowing the stripline resonator to accommodate all of them at one pump frequency. The resulting multi-sideband signal will be first amplified by a 6 GHz cryogenic cooled HEMT (high electron mobility transistor) amplifier, further amplified at room temperature, mixed down to remove the carrier signal and digitized.

For mass spectroscopy applications, the signal can be analyzed by an embedded FPGA processor to perform phase locked measurements. This can provide the frequency shifts of the NEMS pixels arising from mass loading. The demodulated baseband signals can be fed back to the arbitrary waveform generator digitally to continuously track the NEMS pixel resonances. Measurements for the modes (e.g., first and second modes) of the NEMS can be performed exciting the relevant mechanical frequencies and updating the RF pump frequency accordingly. To calculate the time required for a measurement, it should be noted that there is a ring-up time of 5 ms of NEMS from the start of actuation voltage until it reaches the steady-state amplitude. Next, a measurement time of ~10 ms of phase (frequency) may be used to average the phase noise. It should be noted that the phase measurement is not limited by the ring-down of the resonator. However, the phase locked loop does have a unique response time to correct from the feedback to determine the new frequency. In some embodiments, a FPGA-based phase locked loop can have a response time of ~30 ms.

In various embodiments, it is shown that microwave-frequency cavity optomechanics is adaptable to massive multiplexing. In another example, consider coupling a 20-pixel NEMS array, and for each pixel two modes of vibration may be monitored. For a doubly-clamped beam, if the first vibrational mode of the NEMS is at ~20 MHz, the 2nd mode may occur at ~33 MHz. For a quality factor of 100,000 (typically obtained for NEMS at 4K) the fundamental resonance linewidth is only 200 Hz, corresponding to a ring-up time of ~5 ms. The stripline cavity at 6 GHz with Q of ~10,000 has a linewidth of 600 kHz. To ensure the NEMS operate independently from each other they may be frequency-staggered by systematically altering their fabricated geometries. The shift in resonant frequency arising from mass loading should ideally not span the designed frequency separation of the NEMS pixels. With a mass responsivity of 1 mHz/Da, large multiproteoform complexes (e.g., up to 10 MDa total mass) will shift the NEMS frequency downward by roughly 10 kHz, hence prudent design will separate each NEMS by about 30 kHz. Lithographically, the array can be fabricated by step-wise reduction of the lengths of the pixels' beams by 20 nm each, which is feasible lithographically. As such, in a NEMS array of 20 doubly-clamped beams, their lengths may be varied from 6 µm down to 5.6 µm.

Figure 17:
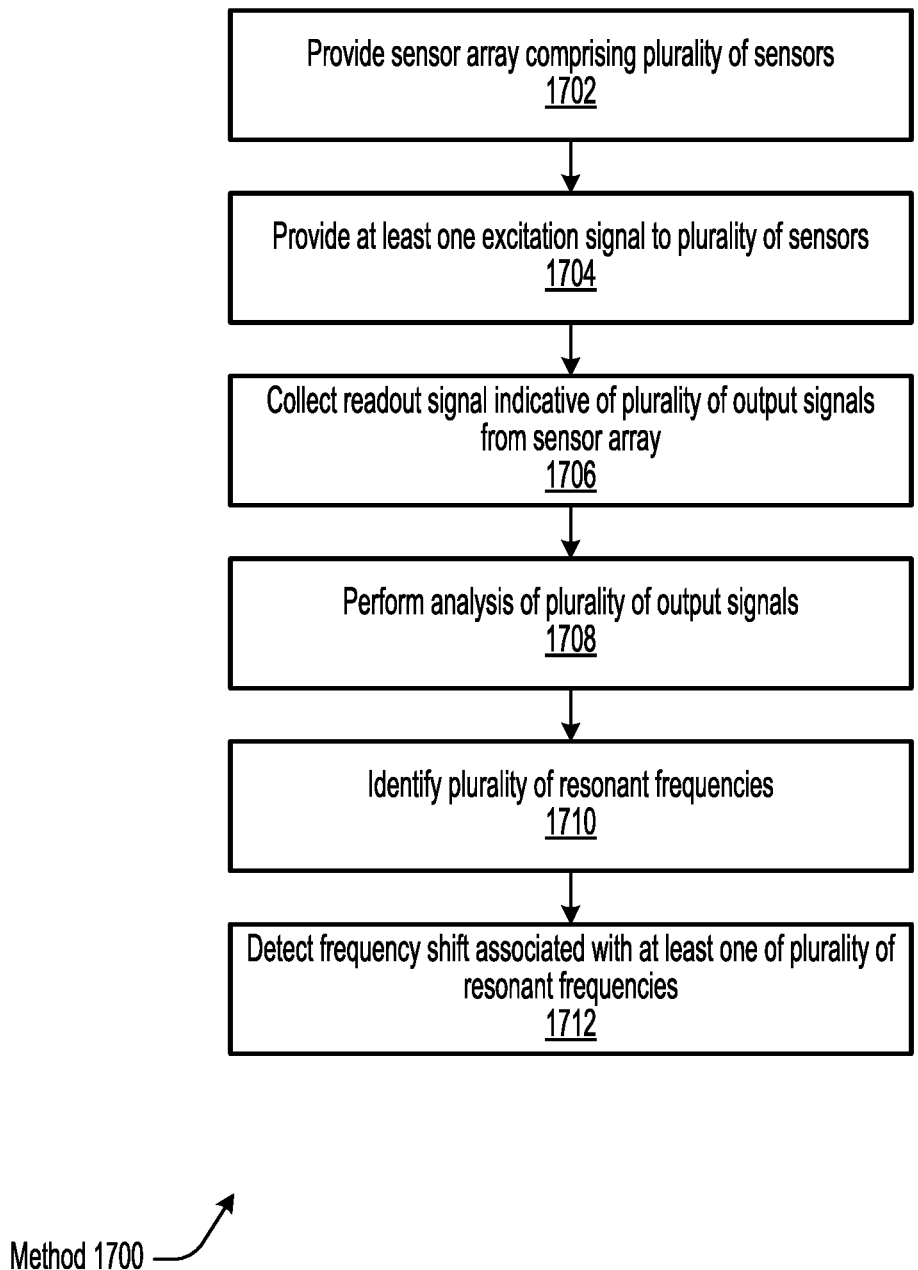
FIG. 17 illustrates a method of operating a readout system according to an embodiment of the present invention.

FIG. 17 illustrates a method 1700 of operating a readout system (e.g., NEMS readout systems 200, 800) according to an embodiment of the present invention. One or more steps of method 1700 may be omitted during performance of method 1700, and steps of method 1700 need not be performed in the order shown. One or more steps of method 1700 may be performed by one or more processors, such as those included in a computing system (e.g., computing system 206). Method 1700 may be implemented as a computer-readable medium or computer program product comprising instructions which, when the program is executed by one or more computers, cause the one or more computers to carry out the steps of method 1700. Such computer program products can be transmitted, over a wired or wireless network, in a data carrier signal carrying the computer program product.

At step 1702, a sensor array (e.g., NEMS sensor arrays 102, 202, 302, 602, 702, 802) is provided. In some embodiments, the sensor array includes a plurality of sensors (e.g., NEMS sensors 104, 304, 604, 704). In some embodiments, the plurality of sensors are NEMS sensors. In some embodiments, each sensor of the plurality of sensors includes a resonator (e.g., resonators 624, 724) with frequency characteristics different from the resonator of each other sensor of the plurality of sensors.

At step 1704, at least one excitation signal (e.g., excitation signals 210, 310, 610, 710) is provided to the plurality of sensors. In some embodiments, the at least one excitation signal comprises a signal having a power across a range of frequencies that is substantially constant. In some embodiments, the at least one excitation signal comprises a signal having a power at each of the plurality of resonant frequencies that is greater than a threshold power.

At step 1706, a readout signal (e.g., readout signals 214, 314, 614, 714A, 714B) is collected from the sensor array. In some embodiments, the readout signal is indicative of a plurality of output signals (e.g., output signals 212, 312, 612, 712A, 712B) corresponding to the plurality of sensors. For example, a first output signal may correspond to a first sensor, a second output signal may correspond to a second sensor, and the like.

At step 1708, an analysis of the plurality of output signals is performed to determine the frequency characteristics associated with the resonator of each sensor of the plurality of sensors. For example, the first output signal may be analyzed to determine the frequency characteristics associated with a first resonator of the first sensor, the second output signal may be analyzed to determine the frequency characteristics associated with a second resonator of the second sensor, and the like.

At step 1710, a plurality of resonant frequencies (e.g., resonant frequencies $f_1, f_2, \ldots, f_N$) are identified based on the analysis. In some embodiments, each resonant frequency of the plurality of resonant frequencies corresponds to one of the plurality of output signals and one of the plurality of sensors. For example, a first resonant frequency may correspond to the first output signal and the first sensor, a second resonant frequency may correspond to the second output signal and the second sensor, and the like. In some embodiments, the plurality of resonant frequencies correspond to a fundamental mode band or a first mode band. In some embodiments, a second plurality of resonant frequencies (e.g., resonant frequencies $k_1 f_1, k_1 f_2, \ldots, k_1 f_N$) are identified based on the analysis. In some embodiments, each resonant frequency of the second plurality of resonant frequencies corresponds to one of the plurality of output signals and one of the plurality of sensors.

In some embodiments, each resonant frequency of the plurality of resonant frequencies is operable to change upon adsorption of an analyte (e.g., analytes 306) on each resonator. The analyte may be a particle, an atom, a molecule, a biomolecule, a protein, or a multi-proteoform complex, among other possibilities.

At 1712, a frequency shift (e.g., frequency shifts $\Delta f_1, \Delta f_2, \ldots, \Delta f_N$) associated with at least one of the plurality of resonant frequencies is detected based on the analysis. In some embodiments, a second frequency shift associated with at least one of the second plurality of resonant frequencies is detected based on the analysis.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of operating a readout system, the method comprising:
   providing a sensor array comprising a plurality of sensors, each sensor of the plurality of sensors including a resonator with frequency characteristics different from the resonator of each other sensor of the plurality of sensors;
   collecting a readout signal indicative of a plurality of output signals from the sensor array, each output signal of the plurality of output signals corresponding to one of the plurality of sensors;
   performing an analysis of the plurality of output signals to determine the frequency characteristics associated with the resonator of each sensor of the plurality of sensors; and
   based on the analysis of the plurality of output signals:
      identifying a first set of the plurality of output signals associated with a first mode band and a second set of the plurality of output signals associated with a second mode band;
      identifying a plurality of resonant frequencies including a first set of the plurality of resonant frequencies corresponding to the first set of the plurality of output signals and the first mode band and a second set of the plurality of resonant frequencies corresponding to the second set of the plurality of output signals and the second mode band; and
      detecting a first frequency shift associated with one of the first set of the plurality of resonant frequencies and a second frequency shift associated with one of the second set of the plurality of resonant frequencies.

2. The method of claim 1, wherein the first set of the plurality of resonant frequencies are related to the second set of the plurality of resonant frequencies by a scalar.

3. The method of claim 1 wherein a first spacing between consecutive resonant frequencies in the first set of the plurality of resonant frequencies is less than a second spacing between consecutive resonant frequencies in the second set of the plurality of resonant frequencies.

4. The method of claim 1, wherein the first mode band is a fundamental mode band.

5. The method of claim 1, wherein each resonant frequency of the plurality of resonant frequencies is operable to change upon adsorption of an analyte on each resonator.

6. The method of claim 5, wherein the analyte is one of a particle, an atom, a molecule, a biomolecule, a protein, or a multi-proteoform complex.

7. The method of claim 1, wherein each output signal of the plurality of output signals is indicative of the frequency characteristics of the resonator of one of the plurality of sensors.

8. The method of claim 1, wherein the plurality of sensors are nanoelectromechanical system (NEMS) sensors.

9. The method of claim 1, further comprising:
   providing at least one excitation signal to the plurality of sensors.

10. The method of claim 9, wherein the at least one excitation signal comprises a signal having a power across a range of frequencies that is substantially constant.

11. The method of claim 9, wherein the at least one excitation signal comprises a signal having a power at each of the plurality of resonant frequencies that is greater than a threshold power.

12. The method of claim 1, wherein the plurality of output signals are collected concurrently.

13. A readout system comprising:
   a sensor array comprising a plurality of sensors, wherein each sensor of the plurality of sensors includes a resonator with frequency characteristics different from the resonator of each other sensor of the plurality of sensors, and wherein the plurality of sensors are configured to generate a plurality of output signals, each output signal of the plurality of output signals being indicative of the frequency characteristics associated with the resonator of one of the plurality of sensors; and
   a computing system coupled to the sensor array, wherein the computing system is configured to:
      collect a readout signal indicative of the plurality of output signals;
      perform an analysis of the plurality of output signals to determine the frequency characteristics associated with the resonator of each sensor of the plurality of sensors; and
      based on the analysis of the plurality of output signals:
         identify a first set of the plurality of output signals associated with a first mode band and a second set of the plurality of output signals associated with a second mode band;
         identify a plurality of resonant frequencies including a first set of the plurality of resonant frequencies corresponding to the first set of the plurality of output signals and the first mode band and a second set of the plurality of resonant frequencies corresponding to the second set of the plurality of output signals and the second mode band; and detect a first frequency shift associated with one of the first set of the plurality of resonant frequencies and a second frequency shift associated with one of the second set of the plurality of resonant frequencies.

14. The readout system of claim 13, wherein the first set of the plurality of resonant frequencies are related to the second set of the plurality of resonant frequencies by a scalar.

15. The readout system of claim 13, wherein a first spacing between consecutive resonant frequencies in the first set of the plurality of resonant frequencies is less than a second spacing between consecutive resonant frequencies in the second set of the plurality of resonant frequencies.

16. The readout system of claim 13, wherein the first mode band is a fundamental mode band.

17. The readout system of claim 13, wherein each resonant frequency of the plurality of resonant frequencies is operable to change upon adsorption of an analyte on each resonator.

18. The readout system of claim 17, wherein the analyte is one of a particle, an atom, a molecule, a biomolecule, a protein, or a multi-proteoform complex.

19. The readout system of claim 13, wherein each output signal of the plurality of output signals is indicative of the frequency characteristics of the resonator of one of the plurality of sensors.

20. A non-transitory computer-readable medium comprising instructions that, when executed by one or more processors, cause the one or more processors to perform operations comprising:

collecting a readout signal indicative of a plurality of output signals from a sensor array comprising a plurality of sensors, each sensor of the plurality of sensors including a resonator with frequency characteristics different from the resonator of each other sensor of the plurality of sensors, wherein each output signal of the plurality of output signals corresponds to one of the plurality of sensors;

performing an analysis of the plurality of output signals to determine the frequency characteristics associated with the resonator of each sensor of the plurality of sensors; and based on the analysis of the plurality of output signals:

identifying a first set of the plurality of output signals associated with a first mode band and a second set of the plurality of output signals associated with a second mode band;

identifying a plurality of resonant frequencies including a first set of the plurality of resonant frequencies corresponding to the first set of the plurality of output signals and the first mode band and a second set of the plurality of resonant frequencies corresponding to the second set of the plurality of output signals and the second mode band; and detecting a first frequency shift associated with one of the first set of the plurality of resonant frequencies and a second frequency shift associated with one of the second set of the plurality of resonant frequencies.

* * * * *